(12) United States Patent
Zaitseva et al.

(10) Patent No.: US 9,274,237 B2
(45) Date of Patent: Mar. 1, 2016

(54) LITHIUM-CONTAINING SCINTILLATORS FOR THERMAL NEUTRON, FAST NEUTRON, AND GAMMA DETECTION

(71) Applicant: Lawrence Livermore National Security, LLC, Livermore, CA (US)

(72) Inventors: Natalia P. Zaitseva, Livermore, CA (US); M. Leslie Carman, San Ramon, CA (US); Michelle A. Faust, Woodland, CA (US); Andrew M. Glenn, Livermore, CA (US); H. Paul Martinez, Livermore, CA (US); Stephen A. Payne, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/253,754

(22) Filed: Apr. 15, 2014

(65) Prior Publication Data
US 2015/0028217 A1    Jan. 29, 2015

Related U.S. Application Data

(60) Provisional application No. 61/859,074, filed on Jul. 26, 2013.

(51) Int. Cl.
*G01T 1/10*   (2006.01)
*G01T 1/204*  (2006.01)
*G01T 3/06*   (2006.01)
*C09K 11/02*  (2006.01)
(Continued)

(52) U.S. Cl.
CPC ............. *G01T 1/2042* (2013.01); *C09K 11/025* (2013.01); *C09K 11/06* (2013.01); *G01T 3/06* (2013.01); *G21K 4/00* (2013.01); *C09K 2211/1007* (2013.01); *C09K 2211/1011* (2013.01); *C09K 2211/1018* (2013.01)

(58) Field of Classification Search
CPC .......................................................... G01T 3/06
USPC ...................................................... 250/361 R
See application file for complete search history.

(56) References Cited

U.S. PATENT DOCUMENTS 3,116,417 A    12/1963   Baskir et al.
3,750,046 A    7/1973    Buehler et al.
3,817,633 A    6/1974    White
(Continued)

FOREIGN PATENT DOCUMENTS

EP    129364 A2    12/1984
EP    0352952 A2   1/1990
(Continued)

OTHER PUBLICATIONS

Fisher et al., "Fast neutron detection with 6Li-loaded liquid scintillator," 2011, Nuclear Instruments and Methods in Physics Research A, vol. 646, pp. 126-134.*
(Continued)

*Primary Examiner* — Kiho Kim
(74) *Attorney, Agent, or Firm* — Zilka Kotab

(57) ABSTRACT

In one embodiment, a scintillator includes a scintillator material; a primary fluor, and a Li-containing compound, where the Li-containing compound is soluble in the primary fluor, and where the scintillator exhibits an optical response signature for thermal neutrons that is different than an optical response signature for fast neutrons and gamma rays.

18 Claims, 13 Drawing Sheets

(51) Int. Cl.
*C09K 11/06* (2006.01)
*G21K 4/00* (2006.01)

(56) References Cited

U.S. PATENT DOCUMENTS

| | | | |
|---|---|---|---|
| 3,886,082 A | 5/1975 | Hyman, Jr. | |
| 3,988,586 A | 10/1976 | Stuart et al. | |
| 4,127,499 A | 11/1978 | Chen et al. | |
| 4,482,808 A | 11/1984 | Tominaga et al. | |
| 4,522,742 A | 6/1985 | Lee et al. | |
| 4,578,213 A | 3/1986 | Simonetti | |
| 4,652,532 A | 3/1987 | Bain et al. | |
| 4,692,266 A * | 9/1987 | Costa et al. | 252/301.17 |
| 4,718,417 A | 1/1988 | Kittrell et al. | |
| 4,930,516 A | 6/1990 | Alfano et al. | |
| 4,957,114 A | 9/1990 | Zeng et al. | |
| 4,957,144 A | 9/1990 | Watanabe et al. | |
| 5,042,494 A | 8/1991 | Alfano | |
| 5,110,500 A | 5/1992 | Walker | |
| 5,131,398 A | 7/1992 | Alfano et al. | |
| 5,261,410 A | 11/1993 | Alfano et al. | |
| 5,313,306 A | 5/1994 | Kuban et al. | |
| 5,348,018 A | 9/1994 | Alfano et al. | |
| 5,436,655 A | 7/1995 | Hiyama et al. | |
| 5,467,767 A | 11/1995 | Alfano et al. | |
| 5,474,816 A | 12/1995 | Falabella | |
| 5,593,879 A | 1/1997 | Steller et al. | |
| 5,606,638 A | 2/1997 | Tymianski et al. | |
| 5,726,453 A | 3/1998 | Lott et al. | |
| 5,769,081 A | 6/1998 | Alfano et al. | |
| 5,833,596 A | 11/1998 | Bonnell et al. | |
| 5,847,394 A | 12/1998 | Alfano et al. | |
| 5,872,363 A | 2/1999 | Bingham et al. | |
| 5,940,460 A | 8/1999 | Seidel et al. | |
| 5,949,069 A | 9/1999 | Chace et al. | |
| 5,975,899 A | 11/1999 | Badoz et al. | |
| 5,976,076 A | 11/1999 | Kolff et al. | |
| 5,997,472 A | 12/1999 | Bonnell et al. | |
| 6,169,289 B1 | 1/2001 | White et al. | |
| 6,255,657 B1 | 7/2001 | Cole et al. | |
| 6,269,169 B1 | 7/2001 | Funk et al. | |
| 6,413,267 B1 | 7/2002 | Dumoulin-White et al. | |
| 6,462,770 B1 | 10/2002 | Cline et al. | |
| 6,477,403 B1 | 11/2002 | Eguchi et al. | |
| 6,529,769 B2 | 3/2003 | Zigler | |
| 6,544,442 B1 | 4/2003 | Bell et al. | |
| 6,598,428 B1 | 7/2003 | Cryan et al. | |
| 6,687,000 B1 | 2/2004 | White | |
| 6,730,019 B2 | 5/2004 | Irion | |
| 6,775,567 B2 | 8/2004 | Cable et al. | |
| 6,817,633 B2 | 11/2004 | Brill et al. | |
| 6,949,069 B2 | 9/2005 | Farkas et al. | |
| 6,975,898 B2 | 12/2005 | Seibel | |
| 6,975,899 B2 | 12/2005 | Faupel et al. | |
| 7,003,147 B2 | 2/2006 | Inoue | |
| 7,016,717 B2 | 3/2006 | Demos et al. | |
| 7,067,079 B2 | 6/2006 | Bross et al. | |
| 7,145,149 B2 | 12/2006 | Cooke et al. | |
| 7,164,138 B2 | 1/2007 | McGregor et al. | |
| 7,172,553 B2 | 2/2007 | Ueno et al. | |
| 7,257,437 B2 | 8/2007 | Demos et al. | |
| 7,372,041 B1 | 5/2008 | Nagarkar et al. | |
| 7,723,114 B1 | 5/2010 | Coates, Jr. et al. | |
| 7,857,993 B2 | 12/2010 | Dai et al. | |
| 7,863,579 B2 | 1/2011 | Suhami | |
| 7,930,516 B1 | 4/2011 | Jin et al. | |
| 7,945,077 B2 | 5/2011 | Demos | |
| 8,177,998 B2 | 5/2012 | Dai et al. | |
| 8,205,707 B2 | 6/2012 | Yamamoto et al. | |
| 8,207,507 B2 | 6/2012 | Zaitseva et al. | |
| 8,208,507 B2 | 6/2012 | Lerner et al. | |
| 8,285,015 B2 | 10/2012 | Demos | |
| 8,314,399 B2 | 11/2012 | Clothier et al. | |
| 8,461,546 B2 | 6/2013 | Payne et al. | |
| 8,580,054 B2 | 11/2013 | Pagoria et al. | |
| 8,584,950 B2 | 11/2013 | Endo et al. | |
| 8,735,843 B2 | 5/2014 | Payne et al. | |
| 8,872,125 B2 | 10/2014 | Zaitseva et al. | |
| 2001/0030744 A1 | 10/2001 | Chang | |
| 2002/0103439 A1 | 8/2002 | Zeng et al. | |
| 2003/0158470 A1 | 8/2003 | Wolters et al. | |
| 2003/0232445 A1 | 12/2003 | Fulghum | |
| 2004/0019281 A1 | 1/2004 | Weber et al. | |
| 2004/0175383 A1 | 9/2004 | Barr et al. | |
| 2005/0020926 A1 | 1/2005 | Wiklof et al. | |
| 2005/0208290 A1 | 9/2005 | Patel | |
| 2006/0054863 A1 * | 3/2006 | Dai et al. | 252/301.4 R |
| 2006/0086311 A1 | 4/2006 | Zagumennyi et al. | |
| 2006/0131589 A1 | 6/2006 | Caruso et al. | |
| 2006/0138340 A1 | 6/2006 | Ianakiev et al. | |
| 2006/0255282 A1 | 11/2006 | Nikolic et al. | |
| 2007/0160279 A1 | 7/2007 | Demos | |
| 2007/0175383 A1 | 8/2007 | Fukuda et al. | |
| 2008/0017804 A1 | 1/2008 | Krishnamoorthy et al. | |
| 2008/0145338 A1 | 6/2008 | Anderson et al. | |
| 2008/0178904 A1 | 7/2008 | Peters | |
| 2008/0267472 A1 | 10/2008 | Demos | |
| 2008/0275171 A1 * | 11/2008 | Song et al. | 524/417 |
| 2009/0023830 A1 | 1/2009 | Imai | |
| 2010/0252741 A1 | 10/2010 | Zaitseva et al. | |
| 2010/0256923 A1 | 10/2010 | Payne et al. | |
| 2011/0266643 A1 | 11/2011 | Engelmann et al. | |
| 2011/0284755 A1 | 11/2011 | Stradins et al. | |
| 2012/0043632 A1 | 2/2012 | Nikolic et al. | |
| 2012/0132819 A1 | 5/2012 | Climent | |
| 2012/0241630 A1 | 9/2012 | Walker et al. | |
| 2012/0317791 A1 | 12/2012 | Frank | |
| 2012/0326042 A1 | 12/2012 | Zaitseva et al. | |
| 2013/0033589 A1 | 2/2013 | Demos | |
| 2013/0099125 A1 | 4/2013 | Grodzins | |
| 2013/0168566 A1 * | 7/2013 | Blackburn et al. | 250/390.11 |
| 2013/0175340 A1 | 7/2013 | Endo et al. | |
| 2013/0181135 A1 | 7/2013 | Payne et al. | |
| 2013/0187056 A1 | 7/2013 | Nikolic et al. | |
| 2013/0263982 A1 | 10/2013 | Pagoria et al. | |
| 2013/0299702 A1 | 11/2013 | Zaitseva et al. | |
| 2014/0027646 A1 | 1/2014 | Zaitseva et al. | |
| 2014/0291532 A1 | 10/2014 | Payne et al. | |

FOREIGN PATENT DOCUMENTS

| | | |
|---|---|---|
| GB | 2254417 A | 10/1992 |
| RU | 1780423 C | 11/1994 |
| WO | 0238040 A2 | 5/2002 |
| WO | 2012014265 A1 | 2/2012 |
| WO | 2012142365 A2 | 10/2012 |

OTHER PUBLICATIONS

Im et al., "Transparent matrix structures for detection of neutron particles based on di-ureasil xerogels," Applied Physics Letters, vol. 84, No. 13, Mar. 29, 2004, pp. 2448-2450.

Im et al., "Transparent Solid-State Lithiated Neutron Scintillators Based on Self-Assembly of Polystyrene-block-poly (ethylene oxide) Copolymer Architectures," Advanced Material, vol. 16, No. 19, Oct. 4, 2004, pp. 1757-1761.

Katagiri et al., "Neutron/γ-ray discrimination characteristics of novel neutron scintillators," Nuclear Instruments and Methods in Physics Research A, vol. 529, 2004, pp. 317-320.

Kazkaz et al., "Comparison of Lithium Gadolinium Borate Crystal Grains in Scintillating and Nonscintillating Plastic Matrices," IEEE Transactions on Nuclear Science, vol. 60, No. 2, Apr. 2013, pp. 1416-1426.

Negina et al., "Plastic Scintillation of Increased Transparency Containing 6Li," Translated from Pribory i Tekhnika Eksperimenta, No. 5, Sep.-Oct. 1980, pp. 60-62.

Sen et al., "Polyester Composite Thermal Neutron Scintillation Films," IEEE Transactions on Nuclear Science, vol. 59, No. 4, Aug. 2012, pp. 1781-1786.

Binder et al., "Preparation and Investigation of a Pulse Shape Discrimination Plastic," Erkezett:, vol. 14, Dec. 10, 1965, pp. 457-461 (non-translated).

(56) References Cited

OTHER PUBLICATIONS

Hull et al., "New Organic Crystals for Pulse Shape Discrimination," IEEE Transactions on Nuclear Science, vol. 56, No. 3, Jun. 2009, pp. 899-903.
Iwanowska et al., "Composite Scintillators as Detectors for Fast Neutrons and Gamma-Radiation Detection in the Border Monitoring," 2009 IEEE Nuclear Science Symposium Conference Record, pp. 1437-1440.
Kubota et al., "A New Solid State Neutron Detector: Particle Identification With a Barium-Fluoride Plastic Scintillator," Nuclear Instruments & Methods in Physics Research, vol. A270, 1998, pp. 598-601.
Grudskaya, Le, "Plastic Scintillators for Seperation of Particles by Pulse Shape," Monokristally I Tekhnika, vol. 3, 1968, pp. 153-156.
Non-Final Office Action from U.S. Appl. No. 12/418,450, dated Nov. 15, 2011.
Non-Final Office Action from U.S. Appl. No. 13/736,898, dated Mar. 8, 2013.
Normand et al., "Discrimination methods between neutron and gamma rays for boron loaded plastic scintillators," Nuclear Instruments & Methods in Physics Research A, vol. 484, 2002, pp. 342-350.
Notice of Allowance from U.S. Appl. No. 12/167,104, dated Jun. 21, 2012.
Notice of Allowance from U.S. Appl. No. 12/418,434, dated Feb. 23, 2012.
Notice of Allowance from U.S. Appl. No. 12/418,450, dated Oct. 22, 2012.
Notice of Allowance from U.S. Appl. No. 13/439,780, dated Jun. 12, 2013.
Notice of Allowance from U.S. Appl. No. 13/439,780, dated Jul. 31, 2013.
Notice of Allowance from U.S. Appl. No. 13/736,898, dated Jan. 13, 2014.
"Tri-Carb 2910 TR Liquid Scintillation Analyzer," PerkinElmer on line product catalog, down-loaded on Jun. 18, 2013.
Peurrung, A. J., "Recent developments in neutron detection," 2000 Elsevier Science B.V., Nuclear Instruments and Methods in Physics Research A, vol. 443, 2000, pp. 400-415.
Pitts et al., "Autofluorescence characteristics of immortalized and carcinogen-transformed human bronchial epithelial cells," 2001 SPIE, Journal of Biomedical Optics, vol. 6, No. 1, Jan. 2001, pp. 31-40.
Quaranta et al., "Doping of polysiloxane rubbers for the production of organic scintillators," Optical Materials, vol. 32, No. 10, 2010, pp. 1317-1320.
Quaranta et al., "Optical and Scintillation Properties of Polydimethyl-Diphenylsiloxane Based Organic Scintillators," IEEE Transactions on Nuclear Science, vol. 57, No. 2, Apr. 2010, pp. 891-900.
Restriction Requirement from U.S. Appl. No. 12/167,104, dated Jun. 8, 2011.
Restriction Requirement from U.S. Appl. No. 13/439,780, dated Mar. 28, 2013.
Richards-Kortum et al., "Spectroscopic Diagnosis of Colonic Dyspiasia," Photochemistry and Photobiology, vol. 53, No. 6, 1991, pp. 777-786.
Sangster et al., "Study of Organic Scintillators," The Journal of Chemical Physics, vol. 24, No. 4, 1956, pp. 670-715.
Schomacker et al., "Ultraviolet Laser-Induced Fluorescence of Colonic Tissue: Basic Biology and Diagnostic Potential," Lasers in Surgery and Medicine 12, 1992, pp. 63-78.
Sen et al., "Polyester Composite Thermal Neutron Scintillation Films," IEEE Transactions on Nuclear Science, vol. 59, No. 4, 2012, pp. 1781-1786.
Shultis et al., "Efficiencies of Coated and Perforated Semiconductor Neutron Detectors," 2004 IEEE, 2004, pp. 4569-4574.
Pagoria et al., U.S. Appl. No. 13/439,780, filed Apr. 4, 2012.
Zaitseva et al., U.S. Appl. No. 13/471,259, filed May 14, 2012.
Demos, S.G., U.S. Appl. No. 13/601,918, filed Aug. 31, 2012.
Nikolic et al., U.S. Appl. No. 13/742,298, filed Jan. 15, 2013.
Udagawa et al., "Aberrant Porphyrin Metabolism in Hepatocellular Carcinoma," Biochemical Medicine, vol. 31, 1984, pp. 131-139.
Varfolomeeva et al., "Polarization Diagrams for the Fluorescence of Single Crystals of Salicylic Acid and Salicylates," Soviet Physics—Crystallography, vol. 13, No. 2, 1968, pp. 209-211.
Vijayan et al., "Growth optical, thermal and mechanical studies of methyl 4- hydroxybenzoate single crystals," Journal of Crystal Growth, vol. 256, 2003, pp. 174-182.
Wang et al., "Morphological instability of crystals grown from thin aqueous solution films with a free surface," Philosophical Magazine A, 1995, vol. 71, No. 2, pp. 409-419.
Zaitseva et al., "Plastic scintillators with efficient neutron/gamma pulse shape discrimination," Nuclear Instruments and Methods in Physics Research A, vol. 668, 2012, pp. 88-93.
Zawirska, B., "Comparative Porphyrin Content in Tumors with Contiguous Non-Neoplastic Tissues," Neoplasma, vol. 26, No. 2, 1979, pp. 223-229.
Zhang et al., "Far-red and NIR Spectral Wing Emission from Tissue under 532 and 632 nm Photo-excitation," Lasers in the Life Sciences, vol. 9, 1999, pp. 1-16.
Zhao et al., "Characteristics of large-sized Ce: YAG Scintillation crystal grown by temperature gradient technique," Journal of Crystal Growth, vol. 253, 2003, pp. 290-296.
Andrianov et al., "Synthesis and Properties of 4-Amino-3-Cyanofurazan," Chemistry of Heterocyclic Compounds, vol. 30, No. 5, 1994, pp. 608-611.
Breukers et al., "Transparent lithium loaded plastic scintillators for thermal neutron detection," Nuclear Instruments and Methods in Physics Research A, vol. 701, 2013, pp. 58-61.
Brooks, F.D., "A Scintillation Counter with Neutron and Gamma-Ray Discriminators," Nuclear Instruments and Methods, vol. 4, 1995, pp. 151-163.
Bryan et al., "Fast Neutron—Gamma Pulse Shape Discrimination of Liquid Scintillation Signals for Time Correlated Measurements," 2003 IEEE Nuclear Science Symposium Conference Record, Oct. 19-25, 2003, pp. 1-5.
Final Office Action from U.S. Appl. No. 13/437,836, dated May 22, 2014.
Jhingan et al, "Simple Ways of n-y Discrimination Using Charge Comparison Technique," ScienceDirect, Nuclear Instruments and Methods in Physics Research A 585 (2008) 165-171.
Nikolic et al., "6.1 aspect ratio silicon pillar based thermal neutron detector filled with 10B," Applied Physics Letters 93, 2008, pp. 133502-1-133502-3.
Nikolic et al., "Fabrication of pillar-structured thermal neutron detectors," IEEE Nuclear Science Symposium Conference Record, 2007, pp. 1577-1580.
Nikolic et al., "Si pillar structed thermal neutron detectors: fabrication challenges and performance expectations," Lawrence livermore national laboratory, LLNL-PROC-480809, 2011, pp. 1-13.
Non-Final Office Action from U.S. Appl. No. 13/437,836, dated Nov. 7, 2013.
Notice of Allowance from U.S. Appl. No. 13/477,910, dated Apr. 16, 2014.
Shaposhnikov et al., "New Heterocycles with a 3-Aminofurazanyl Substituent," Russian Journal of Organic Chemistry, vol. 38, No. 9, 2002, pp. 1351-1355.
Soderstrom et al., "Digital Pulse-Shape Discrimination of Fast Neutrons and y Rays," ScienceDirect, Nuclear Instruments and Methods in Physics Research A 594, 2008, pp. 79-89.
Demos, S.G., U.S. Appl. No. 11/292,406, filed Nov. 30, 2005.
Advisory Action from U.S. Appl. No. 13/736,898, dated Dec. 9, 2013.
Alfano et al., "Laser Induced Fluorescence Spectroscopy from Native Cancerous and Normal Tissue," IEEE Journal of Quantum Electronics, vol. QE-20, No. 12, 2003, pp. 1507-1511.
Anutgan et al., "Effect of heat treatment on the stress and structure evolution of plasma deposited boron nitride thin films," Surface and Coatings Technology, vol. 202, 2008, pp. 3058-3066.
Bell et al., "Gadolinium- and Boron-Loaded Organic Scintillators for Neutron Detection," Transactions of the American Nuclear Society, vol. 83, 2000, pp. 259-260.

(56) References Cited

OTHER PUBLICATIONS

Bello et al, "Deposition of thick cubic boron nitride films: The route to practical applications," Diamond & Related Materials, vol. 14, 2005, pp. 1154-1162.
Binder et al., "Preparation and Investigation of a Pulse Shape Discrimination Plastic," Erkezett, vol. 14, 1965, pp. 457-461 (non-translated).
Britvich et al., "New Polystyrene-Based Scintillators," Instruments and Experimental Techniques, vol. 45, No. 5, 2002, pp. 644-654.
Brooks, F.D., "Development of Organic Scintillators" Nuclear Instruments and Methods 162, 1979, pp. 477-505.
Brown et al., "Applications of Nanoparticles in Scintillation Detectors," Antiterrorism and Homeland Defence: Polymers and Materials, American Chemical Society, vol. 980, 2008, pp. 117-129.
Carturan et al., "Novel Polysiloxane-Based Scintillators for Neutron Detection," Radiation Protection Dosimetry, vol. 143, No. 2-4, 2011, pp. 471-476.
Corle et al., "Chapter 2—Instruments," Confocal Scanning Optical Microscopy and Related Imaging Systems, 1996, pp. 67-145.
Demos et al., "Subsurface Imaging Using the Spectral Polarization Difference Technique and NIR Illumination," Lawrence Livermore National Laboratory, 1999, pp. 406-410.
Demos et al., "Tissue Imaging for Cancer Detecting Using NIR Autofluorescence," Proceedings of SPIE, vol. 4613, 2002, pp. 31-34.
Dusane, R. O., "Opportunities for new materials synthesis by hot wire chemical vapor process," Thin Solid Films, vol. 519, 2011, pp. 4555-4560.
Final Office Action from U.S. Appl. No. 12/167,104, dated Feb. 23, 2012.
Final Office Action from U.S. Appl. No. 12/418,450, dated Feb. 24, 2012.
Final Office Action from U.S. Appl. No. 13/736,898, dated Jun. 24, 2013.
Fisher et al., "Fast neutron detection with 6Li-loaded liquid scintillator," Nuclear Instruments and Methods in Physics Research A, vol. 646, 2011, pp. 126-134.
Gervino et al., "A low background, large solid angle neutron detector for spectroscopy and dosimetry application," Sensors and Actuators A, vol. 41-42, 1994, pp. 497-502.
Greenwood et al., "Li-Salicylate Neutron Detectors with Pulse Shape Discrimination," Nuclear Instruments and Methods 165, 1979, pp. 129-131.
Grudskaya, L.E., "Plastic Scintillators for Seperation of Particles by Pulse Shape," Monokristally I Tekhnika, vol. 3, 1968, pp. 153-156.
Hamel et al., "Fluorescent 1,8-naphthalimides-containing polymers as plastic scintillators. An attempt for neutron-gamma discrimination," Reactive & Functional Polymers, vol. 68, No. 12, 2008, pp. 1671-1681.
He et al., "Improvement of adhesion of cubic boron nitride films: effect of interlayer and deposition parameters," Materials Science Form, vol. 475-479, 2005, pp. 3637-3638.
Hull et al., "New Organic Crystals for Pulse Shape Discrimination," IEEE Transactions on Nuclear Science, vol. 56, No. 3, 2009, pp. 899-903.
Im et al., "Scintillators for Alpha and Neutron Radiations Synthesized by Room Temperature Sol-Gel Processing," Journal of Sol-Gel Science and Technology, vol. 32, 2004, pp. 117-123.
Im et al., "Transparent matrix structures for detection of neutron particles based on di-ureasil xerogels," Applied Physics Letters, vol. 84, No. 13, 2004, pp. 2448-2450.
Im et al., "Transparent Solid-State Lithiated Neutron Scintillators Based on Self-Assembly of Polystyrene-block-poly (ethylene oxide) Copolymer Architectures," Advanced Material, vol. 16, No. 19, 2004, pp. 1757-1761.
International Preliminary Report and Written Opinion from PCT Application No. PCTUS2012033449 dated Oct. 24, 2013.
Iwanowska et al., "Composite Scintillators as Detectors for Fast Neutrons and Gamma-Radiation Detection in the Border Monitoring," 2009 IEEE Nuclear Science Symposium Conference Record, 2009, pp. 1437-1440.
Karim et al., "Effect of deposition parameters on the formation of cubic BN films deposited by plasma-assisted chemical vapour deposition from non-toxic material," Surface and Coatings Technology, vol. 54-55, 1992, pp. 335-359.
Katagiri et al., "Neutron/γ-ray discrimination characteristics of novel neutron scintillators," Nuclear Instruments and Methods in Physics Research A, vol. 529, 2004, pp. 317-320.
Katagiri et al., "Scintillation materials for neutron imaging detectors," Nuclear Instruments & Methods in Physics Research A, vol. 529, 2004, pp. 274-279.
Kazkaz et al., "Comparison of Lithium Gadolinium Borate Crystal Grains in Scintillating and Nonscintillating Plastic Matrices," IEEE Transactions on Nuclear Science, vol. 60, No. 2, 2013, pp. 1416-1426.
Kesanli et al., "Highly efficient solid-state neutron scintillators based on hybrid sol-gel nanocomposite materials," Applied Physics Letters, vol. 89, 2006, pp. 214104/1-214104/3.
Kim et al., "Characteristics of Hybrid Plastic Scintillators for Slow Neutron Measurements," 2007 IEEE Nuclear Science Symposium Conference Record, pp. 1971-1975.
Kim et al., "Performance of Hybrid Plastic Scintillator Detectors for Low-Energy Neutron Measurements," Journal of the Korean Physical Society, vol. 52, No. 3, Mar. 2008, pp. 908-912.
Koshimizu et al., "Organic-Inorganic Hybrid Scintillator for Neutron Detection Fabricated by Sol-Gel Method," Japanese Journal of Applied Physics, vol. 47, No. 7, 2008, pp. 5717-5719.
Kubota et al., "A New Solid State Neutron Detector: Particle Identification With a Barium-Fluoride Plastic Scintillator,"; Nuclear Instruments & Methods in Physics Research, vol. A270, 1998, pp. 598-601.
Lattemann et al., "New approach in depositing thick, layered cubic boron nitride coatings by oxygen additionstructural and compositional analysis," Thin Solid Films, vol. 515, 2006, pp. 1058-1062.
Malik et al., "Destruction of erythoroleukaemic cells by photoactivation of endogenous porphyrins," British Journal of Cancer, vol. 56, 1987, pp. 589-595.
Mandshukov et al., "Properties of a New Class of Organic Scintillators: Derivatives of Salicylic Acid," Plenum Publishing Corporation, Translated May-Jun. 1981 from Pribory i Tekhnika Eksperimenta, 1982, pp. 605-611.
Matsumoto et al., "The intorducing of fluorine into the deposition of BN: a successful method to obtain high-quality, thick cBN films with low residual stress," Diamond and Related Materials, vol. 10, 2001, pp. 1868-1874.
Mcgregor et al., "New Surface Morphology for Low Stress Thin-Film-Coated Thermal Neutron Detectors," IEEE Transactions on Nuclear Science, vol. 49, No. 4, 2002, pp. 1999-2004.
Navone et al., "Heme Biosynthesis in Human Breast Cancer-Mimetic "In Vitro" Studies and Some Heme Enzymic Activity Levels," International Journal on Biochemistry, vol. 22, No. 12, 1990, pp. 1407-1411.
Negina et al., "Plastic Scintillation of Increased Transparency Containing 6Li," Translated Sep.-Oct. 1980 from Pribory i Tekhnika Eksperimenta, No. 5, 1981, pp. 60-62.
Non-Final Office Action from U.S. Appl. No. 12/167,104, dated Sep. 15, 2011.
Non-Final Office Action from U.S. Appl. No. 12/418,434, dated May 20, 2011.
Non-Final Office Action from U.S. Appl. No. 12/418,434, dated Nov. 22, 2011.
Non-Final Office Action from U.S. Appl. No. 12/418,450, dated Jun. 14, 2012.
Non-Final Office Action from U.S. Appl. No. 12/418,450, dated Jul. 13, 2011.
Zaitseva et al., U.S. Appl. No. 13/437,836, filed Apr. 2, 2012.
Yarovenko et al., "15N NMR study of the mechanism of the reaction of amidoximes with nitriles in the presence of ZnCl2 and HCl," 1995 Plenum Publishing Corporation, Russian Chemical Bulletin, vol. 43, No. 4, 1994, pp. 627-629.
Yarovenko et al., "A convenient synthesis of 3-substituted 5-guanidino-1, 2, 4-Oxadiazoles," 1994 Plenum Publishing Corporation, Russian Chemical Bulletin, vol. 43, No. 1, Jan. 1994, pp. 114-117.

(56) References Cited

OTHER PUBLICATIONS

Yarovenko et al., "New Synthesis of 1,2,4-Oxadiazoles," Tetrahedron, vol. 46, No. 11, 1990, pp. 3941-3952.

Yarovenko et al., "Synthesis of 2-amino-5-(5R-1,2,4-Oxadiazolyl)-1, 3,4-Oxadiazoles," 1994 Plenum Publishing Corporation, Russian Chemical Bulletin, vol. 42, No. 12, Dec. 1993, pp. 2014-2017.

Zaitseva et al., "Neutron detection with single crystal organic scintillators," SPIE Hard X-Ray, Gamma-Ray, and Neutron Detector Physics, Lawrence Livermore National Laboratory, Jul. 20, 2009, pp. 1-10.

Non-Final Office Action from U.S. Appl. No. 13/601,918, dated Feb. 23, 2015.

Non-Final Office Action from U.S. Appl. No. 14/248,951, dated Jan. 20, 2015.

Non-Final Office Action from U.S. Appl. No. 13/471,259, dated Dec. 31, 2014.

Non-Final Office Action from U.S. Appl. No. 13/742,298, dated Dec. 17, 2014.

Zaitseva et al., "Pulse shape discrimination with lithium-containing organic scintillators," Nuclear Instruments and Methods in Physics Research A, vol. 729, 2013, pp. 747-754.

Sen et al., "Thermal Neutron Scintillator Detectors Based on Poly (2-Vinylnaphthalene) Composite Films," IEEE Transactions on Nuclear Science, vol. 58, No. 3, Jun. 2011, pp. 1386-1393.

Non-Final Office Action from U.S. Appl. No. 13/471,259, dated Apr. 16, 2015.

Non- Final Office Action U.S. Appl. No. 13/437,836, dated Nov. 17, 2014.

Final Office Action from U.S. Appl. No. 13/437,836, dated Jun. 4, 2015.

Non-Final Office Action from U.S. Appl. No. 13/471,259, dated Jul. 30, 2015.

Lawrence Livermore National Laboratory, "Laboratory Directed Research and Development," FY2007 Annual Report, Mar. 20, 2008, 262 pages.

Sellin et al., "Digital Pulse Shape Discrimination Applied to Capture-Gated Neutron Detectors," Department of Physics, Radiation Imaging Group, Presentation, University of Surrey, Guildford, UK, 2008, pp. 1-18.

Soderstrom, "Pulse Shape Discrimination Between Neutrons and Gamma Rays with Digital Electronics," Nuclear Structure Group, Department of Nuclear and Particle Physics, Presentation, Uppsala University, 2008, pp. 1-27.

Abdurashitov,et al., "A high resolution, low background fast neutron spectrometer," Nucl. Instrum. Meth. A, vol. 476, Issues 1-2, Jan. 1, 2002, pp. 318-321.

Bell, Z.W., "Boron-loaded silicone rubber scintillators," IEEE Trans. Nucl. Sci., vol. 51, Issue 4, 2004, pp. 1773-1776.

Bessiere, et al. "Luminescence and scintillation properties of CS 2 LiYCI 6: Ce 3+for ? and neutron detection," Nuclear Instruments and Methods in Physics Research Section A: Accelerators, Spectrometers, Detectors and Associated Equipment, vol. 537, Issue 1, Jan. 21, 2005, pp. 242-246.

Birowosuto, et al., "Li-Based Thermal Neutron Scintillator Research; and Other Elpasolites," Nuclear Science, IEEE Transactions, vol. 55, Issue 3, Jun. 2008, pp. 1152-1155.

Bollinger, et al., "Measurements of the time dependence of scintillation intensity by a delayed-coincidence method", G.E., Rev. Sci. Instr., vol. 32, Issue 9, 1961, pp. 1044-1050 (published online Dec. 29, 2004).

Brooks et al., "Pulse shape discrimination in plastic scintillators", Nuclear Science, IRE Transactions, NS vol. 7, Issue 2-3, Jun. 1960, pp. 35-38.

Carman, et al., "The effect of material purity on the optical and scintillation properties of solution-grown trans-stilbene crystals," Journal of Crystal Growth, vol. 368, 2013, pp. 56-61.

Flaska, et al., "Digital pulse shape analysis for the capture-gated liquid scintillator BC-523A," Nuclear Instruments and Methods in Physics Research Section A: Accelerators, Spectrometers, Detectors and Associated Equipment, vol. 599, Issue 2, Feb. 11, 2009, pp. 221-225.

Glodo, et al., "Scintillator for Nuclear Monitoring Applications," Nuclear Science, IEEE Transactions, vol. 56, Issue 3, Jun. 2009, pp. 1257-1261.

Greenwood, "6Li-loaded liquid scintillators with pulse shape discrimination," Rev. Sci. Instrum., vol. 50, Issue, 4, 1979, pp. 472-477.

Hansen, et al., "Neutron-gamma discrimination in plastic scintillators", IEEE Trans. Nucl. Sci., vol. 47, Issue 6, Dec. 2000, pp. 2024-2028.

Kiff, et al., "Neutron detection and identification using ZnS:Ag/ 6LiF in segmented antineutrino detectors," Nuclear Instruments & Methods in Physics Research Section A: Accelerators, Spectrometers, Detectors and Associated Equipment and Associated Equipment, vol. 652, Issue 1, Oct. 1, 2011, pp. 412-416.

Nakae, et al., "Recent developments in fast neutron detection and multiplicity counting with liquid scintillator," 2nd Japan IAEA Workshop on Advanced Safeguards Technology for the Future Nuclear Fuel Cycle, Nov. 10, 2009 through Nov. 13, 2009, Tokai, Japan, LLNL Presentation, Publication Jan. 15, 2010, 11 pages.

Nieman et al., "Rapid Triplet Excitation Migration in Organic crystals", J. Chem. Phys., vol. 37, Issue 9, 1962 (published online Jul. 20, 2004), pp. 2150-2151.

Owen, R. B., "The decay times of organic scintillators and their application to the discrimination between particles of different specific ionization", I.R.E. Transactions on Nuclear Science, vol. 5, Issue 3, Dec. 1958, pp. 198-201.

Phillips, et al., "Measurements of scintillation lifetimes", Rev. Sci. Instr., vol. 24, Issue 8, 1953 (published online Dec. 29, 2004), pp. 611-616.

Popov, et al., "Lithium glass scintillator neutron detector as an improved alternative to the standard 3 he proportional counter," In Nuclear Science Symposium Conference Record (NSS/MIC), 2010 IEEE, pp. 1819-1822.

Ross et al., "A new liquid scintillator for thermal neutron detection," Nuclear Science and Engineering, vol. 20, Issue 1, Sep. 1964, pp. 23-27.

Runkle, et al., "Securing special nuclear material: Recent advances in neutron detection and their role in nonproliferation," J. Appl. Phys., vol. 108, Issue 11, Dec. 7, 2010, p. 111101-1-111101-21.

Swiderski et al., "Boron-10 loaded BC523A liquid scintillator for neutron detection in the border monitoring," Nuclear Science, IEEE Transactions, vol. 55, Issue 6, 2008, pp. 3710-3716.

Swiderski et al., "Further study of boron-10 loaded liquid scintillators for detection of fast and thermal neutrons." Nuclear Science, IEEE Transactions vol. 57, Issue 1, Feb. 1, 2010, pp. 375-380.

Szczesniak, T., et al. "Light pulse shapes in liquid scintillators originating from gamma-rays and neutrons," Nuclear Science, IEEE Transactions, vol. 57, Issue 6, Dec. 2010, pp. 3846-3852.

Syntfeld, et al., "/sup 6/Lil (Eu) in neutron and/spl gamma/-ray spectrometry-a highly sensitive thermal neutron detector," Nuclear Science, IEEE Transactions, vol. 52, Issue 6, Dec. 2005, pp. 3151-3156.

Wang et al., "A feasibility study of boron-loaded liquid scintillator for the detection of electron anti-neutrinos," Nuclear Instruments and Methods in Physics Research Section A: Accelerators, Spectrometers, Detectors and Associated Equipment, vol. 432, Issue 1, Aug. 1, 1999, pp. 111-121.

Winyard, et al., "Pulse shape discrimination in inorganic and organic scintillators", Nucl. Instr. and Meth., vol. 95, Issue 1, 1971, pp. 141-153.

Wright, et al., "Scintillation Decay Times of Organic Crystals", Proc. Phys.Soc.,Section B, vol. 69, Issue 3, Mar. 1, 1956, pp. 358-372.

Zaitseva et al., "Growth and properties of Lithium Salicylate single crystals," Cystal Growth & Design, Lawrence Livermore National Laboratory, Feb. 25, 2009, 14 pages.

Zaitseva et al., "Pulse shape discrimination in impure and mixed single-crystal organic scintillators", IEEE Trans. Nucl. Sci., vol. 58, Issue 6, Apr. 26, 2011, 35 pages.

(56) References Cited

OTHER PUBLICATIONS

Zaitseva, et al., "Rapid growth of large-scale (40-55 cm) KH2PO4 Crystal," Journal of Crystal Growth, vol. 180, Issue 2, Dec. 1997, pp. 255-262.

Notice of Allowance from U.S. Appl. No. 13/437,836, dated Sep. 24, 2015.

Final Office Action from U.S. Appl. No. 13/471,259, dated Nov. 12, 2015.

* cited by examiner

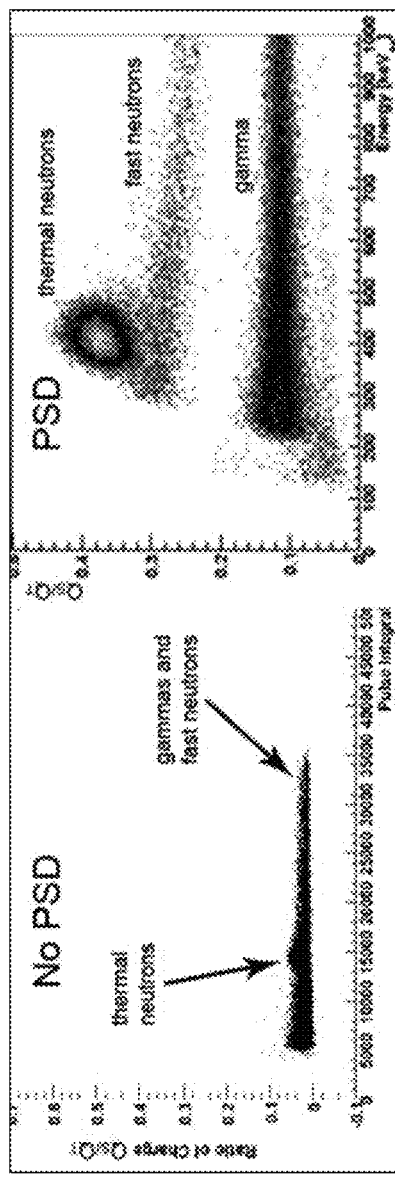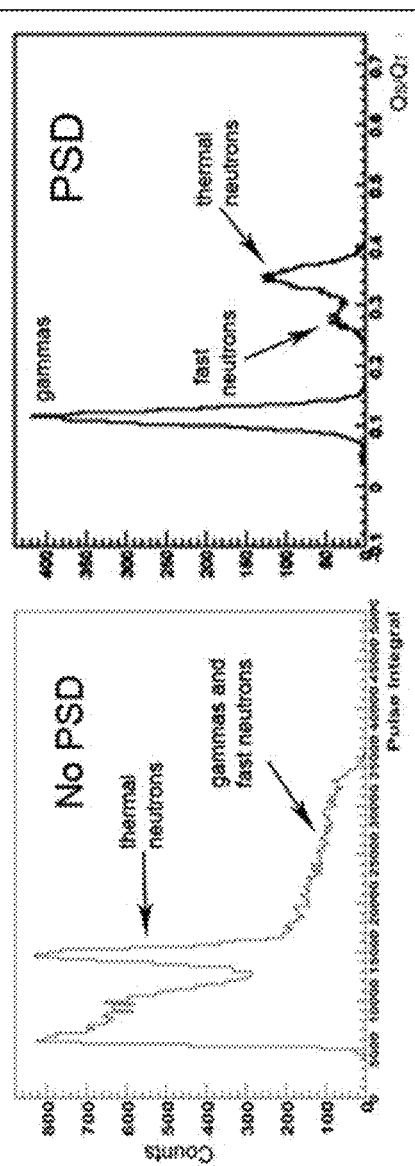
FIG. 5A  FIG. 5B  FIG. 5C  FIG. 5D

LITHIUM-CONTAINING SCINTILLATORS FOR THERMAL NEUTRON, FAST NEUTRON, AND GAMMA DETECTION

RELATED APPLICATIONS

This application claims priority to Provisional U.S. Application No. 61/859,074 filed on Jul. 26, 2013, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiation detection, and more particularly to Li-containing scintillators for thermal neutron, fast neutron and gamma detection, and methods of making and using the same.

BACKGROUND

Radioactive materials are often detected and identified by measuring gamma-rays and/or neutrons emitted from the materials. The energy of gamma-rays is specific to that particular material and acts as a "finger print" to identify the material. Similarly, neutron energy is particular to the material, and may be used to identify the material. Of very high value are detectors capable of identifying the distinctive time-correlated signatures corresponding to neutrons and gamma rays, or "gammas" emitted by fissioning material from within a background of uncorrelated natural radiation. A detector capable of distinguishing neutrons from gammas, as well as offering a fast response time typically has better capability for detecting the distinctive time-correlated events indicative of the presence of fissioning nuclei.

The ability to detect gamma rays and/or neutrons is a vital tool for many areas of research. For example, gamma-ray/neutron detectors allow scientists to study celestial phenomena and diagnose medical diseases. Additionally, these detectors are important tools for homeland security, helping the nation confront new security challenges. The nuclear nonproliferation mission requires detectors capable of identifying diversion or smuggling of nuclear materials. Government agencies need detectors for scenarios in which a terrorist might use radioactive materials to fashion a destructive device targeted against civilians, structures, or national events. To better detect and prevent nuclear incidents, the Department of Energy (DOE) and the Department of Homeland Security (DHS) are funding projects to develop a suite of detection systems that can search for radioactive sources in different environments.

One particularly useful type of radiation detection, pulse shape discrimination (PSD) provides means for high-energy neutron detection in the presence of gamma radiation background by utilizing the difference in the shapes of scintillation pulses excited by neutrons (recoil protons) and gamma (γ)-rays in organic scintillators. PSD phenomena are based on the existence of two-decay component fluorescence, in which, in addition to the main component decaying exponentially (prompt fluorescence), there is usually a slower emission that has the same wavelength, but longer decay time (delayed emission). According to a commonly accepted mechanism shown in FIG. 1, the fast component results from the direct radiative de-excitation of excited singlet states ($S_1$), while the slow component originates from the collisional interaction of pairs of molecules (or excitons) in the lowest excited n-triplet states ($T_1$).

Since the triplet is known to be mobile in some compounds, the energy migrates until the collision of two triplets collide and experience a process, shown as Equation 1:

$$T_1 + T_1 \rightarrow S_0 + S_1 \qquad \text{Equation 1}$$

In Equation 1, $T_1$ is a triplet, $S_0$ is the ground state, and $S_1$ is a first excited state. Finally, the delayed singlet emission occurs with a decay rate characteristic of the migration rate and concentration of the triplet population, and is represented by Equation 2:

$$S_1 \rightarrow S_0 + h\nu \qquad \text{Equation 2}$$

In Equation 2, hν is fluorescence, while $S_0$ is the ground state and $S_1$ is a first excited state. The lifetime of the delayed emission is determined by the lifetime of $T_1$ and the rate of $T_1T_1$ collisions. The short range of the energetic protons produced from neutron collisions yields a high concentration of triplets, compared to the longer range of the electrons from the gamma interactions, leading to the enhanced level of delayed emission with longer decay times in neutron-induced pulses in comparison to those produced by the gamma excitation. The observation of PSD in organics with phenyl groups is believed to be, in part, related to the aromatic ring structure, allowing for the migration of triplet energy.

FIG. 2A shows a plot of average waveforms for a stilbene test crystal indicating different levels of delayed light in neutron and gamma scintillation pulses. As can be seen from the plot, some light is produced by the crystal almost immediately, referred to as prompt light, and other light is produced by the crystal over a period of time, referred to as delayed light. Generally, the plot for each type of radiation will have a steep component 202 and a tail component 204. The upper line in the plot represents neutron light decay, while the lower line represents gamma (γ) light decay. As shown in FIG. 2A, the shape for the neutron response has a large tail component 204, which is much smaller or almost negligible for gammas. Thus, stilbene is able to differentiate between the neutron and gamma light decays, and produces noticeably different lines for each radiation type. However, not every compound has this ability to separate between gamma and neutron light decay; therefore compounds with such ability are very useful for PSD.

Modern high-speed waveform digitizers allow for easy separation of neutron and gamma pulses, enabling rapid characterization of PSD properties, as shown in FIG. 2B. The waveforms may be numerically integrated over two time intervals: $\Delta_{Total}$ and a subinterval $\Delta_{Tail}$ (e.g., for >50 nsec), corresponding to the total charge and the delayed component of the signal, respectively. The value of the ratio of charge $R=Q_{Tail}/Q_{Total}$ for the two time intervals indicates whether the considered event was likely produced by a neutron (high R value) or a gamma ray (small R value). The plot shown in FIG. 2B reveals the presence of both neutrons (upper scatter points) and gammas (lower scatter points) in a plot of the ratio of charge ($Q_{Tail}/Q_{Total}$) versus the pulse height.

FIG. 2C illustrates one approach where the neutron/gamma delayed light separation, S, in the stilbene test crystal is used for calculation of the PSD figure of merit (FOM). The PSD separation, S, refers to the gap between the mean ratio of charge ($Q_{Tail}/Q_{Total}$) for gamma rays and the mean ratio of charge ($Q_{Tail}/Q_{Total}$) for neutrons taken over an extended period of time. The larger the separation, S, the better the organic crystal is at PSD for distinguishing gammas and neutrons.

The PSD technique is most frequently utilized for discrimination between fast neutrons (recoil protons) and gamma-rays (Compton electrons) using liquid scintillators and a few organic crystals. Recent developments broadened the group of PSD materials to include scintillating plastics. However, because the composition of organic scintillators is currently comprised of mostly hydrocarbons, traditional PSD materials can be used only for detection of fast neutrons, leaving undetected the large fraction of low-energy and thermal neutrons that do not generate enough light in elastic scatter interaction.

Present techniques for detection of thermal neutrons are typically based on $^3$He detectors. However, due to the imminent shortage of $^3$He, other neutron detection technologies utilizing $^{10}$B- and $^6$Li-loaded scintillating materials have been considered as possible replacements for $^3$He detectors. The neutron detection properties of $^{10}$B- and $^6$Li-containing scintillators are based on known capture reactions:

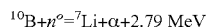

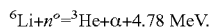

Current scintillators utilizing the thermal neutron detection capabilities of $^{10}$B generally use boron in a gaseous form, as $BF_3$, or in a solid form consisting of pure boron or a compound mixture (e.g. boron carbide) present in a matrix. Moreover, current scintillators utilizing the thermal neutron detection capabilities of $^6$Li include inorganic single crystals (e.g. LiI, LiF, Li-aluminate, $Cs_2LiYCl_6$:Ce (CLYC), $^6$Li-lanthanide borate, etc.), $^6$Li-loaded glass scintillators, and composite materials including dispersions of nano- or microparticles of different Li-containing compounds (e.g. nano- or microscale Li-containing crystals) in liquid or plastic matrices.

However, there are several disadvantages associated with existing $^{10}$B and $^6$Li based detectors. For example, single crystal detectors are limited by the size of the crystals that can be grown and the high cost of doing so. Additionally, difficulties that may arise from use of $^6$Li-loaded and/or $^{10}$B-loaded glass scintillators include long decay times and high sensitivity to gamma rays due to the presence of relatively heavy constituents in their compositions. Further, a drawback with composite materials comprising dispersions of small scintillating compounds, e.g. Li-containing crystals, in polymer and/or liquid matrices includes elevated levels of light scatter due to inhomogeneous composition and structure, as well as limitations in effective neutron detecting due to insufficient optical clarity in the scintillating wavelength region.

SUMMARY

According to one embodiment, a thermal neutron capture reagent includes a lithium-containing compound selected from a group consisting of: Li-3-phenylsalicylate, Li-3,5-di-tert-butylsalicylate, Li-acetylsalicylic acid, and combinations thereof, where the lithium-containing compound is soluble in a fluor, and where the thermal neutron capture reagent exhibits an optical response signature for thermal neutrons.

According to another embodiment, a scintillator includes a scintillator material; a primary fluor, and a Li-containing compound, where the Li-containing compound is soluble in the primary fluor, and where the scintillator exhibits an optical response signature for thermal neutrons that is different than an optical response signature for fast neutrons and gamma rays.

According to yet another embodiment, a method for fabricating a scintillator includes forming a precursor mixture, and heating the precursor mixture until a polymerization process is complete. The precursor mixture includes a monomer, one or more fluors, a coordinating solvent, and a Li-containing compound selected from a group consisting of: Li-3-phenylsalicylate, Li—Li-3,5-di-tert-butylsalicylate. Li-acetylsalicylic acid, and combinations thereof, where the Li-containing compound is soluble in at least one of the one or more fluors.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5A shows the fraction of delayed light (Qs) in a total scintillation pulse (Qr) for a $^6$Li-containing non-PSD plastics scintillator measured using a moderated $^{252}$Cf source.

FIG. 5B shows a pulse height spectrum corresponding to the neutron signatures obtained with a $^6$Li-containing non-PSD plastics scintillator using a moderated $^{252}$Cf source.

FIG. 5C shows the fraction of delayed light ($Q_S$) in a total scintillation pulse ($Q_T$) for a $^6$Li-containing PSD plastics scintillator measured using a moderated $^{252}$Cf source.

FIG. 5D shows separated signatures of neutrons and gammas in a $^6$Li-containing PSD plastics scintillator.

DETAILED DESCRIPTION

Figure 1:
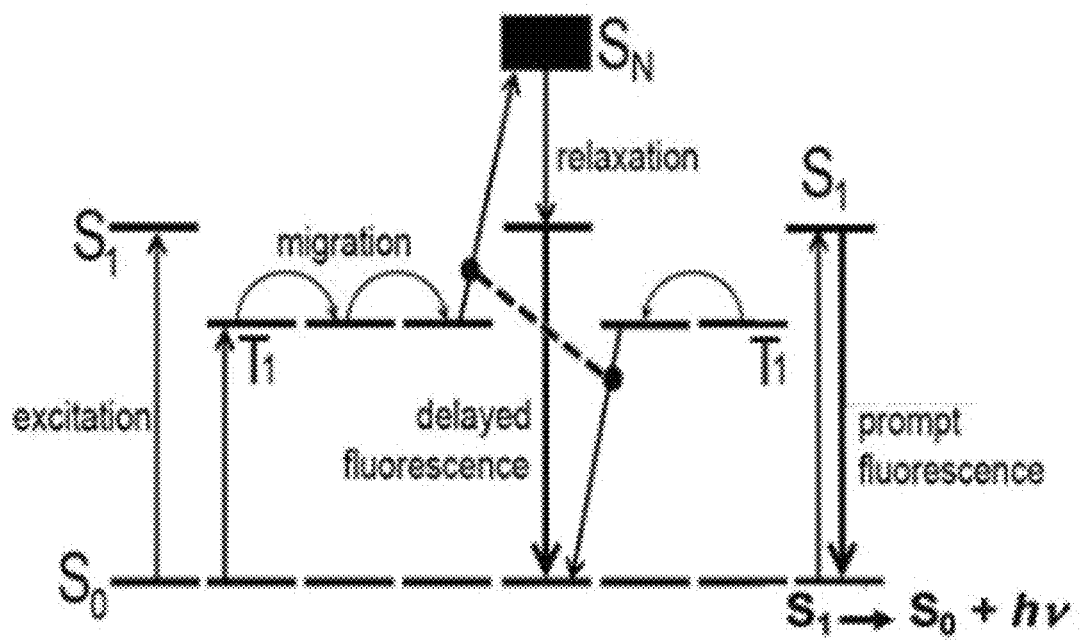
FIG. 1 shows a mechanism for delayed photoluminescence according to the prior art.
Figure 1:
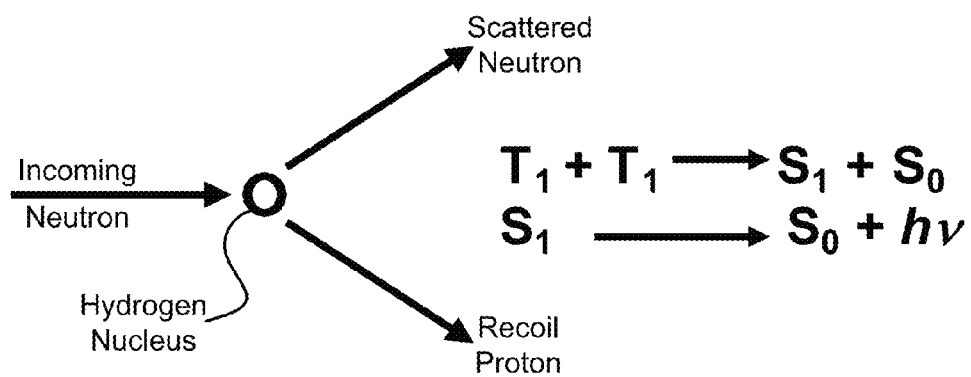
Figure 2A:
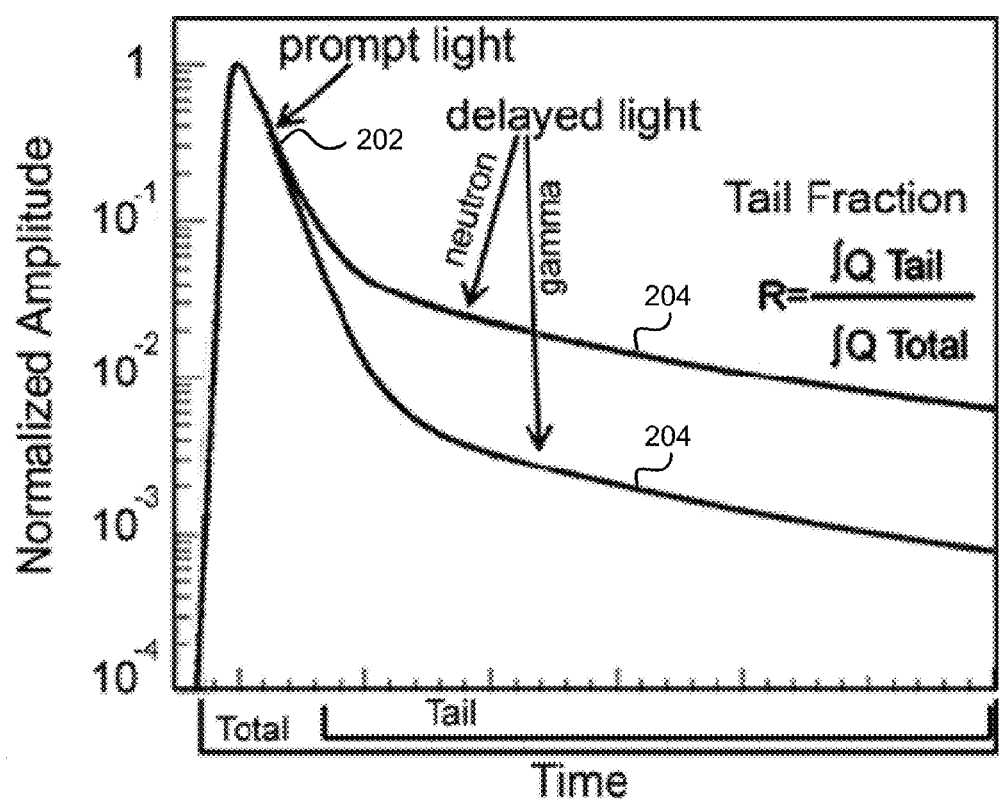
FIG. 2A shows a plot of average waveforms for stilbene indicating different levels of delayed light in neutron and gamma scintillation pulses according to one embodiment.
Figure 2B:
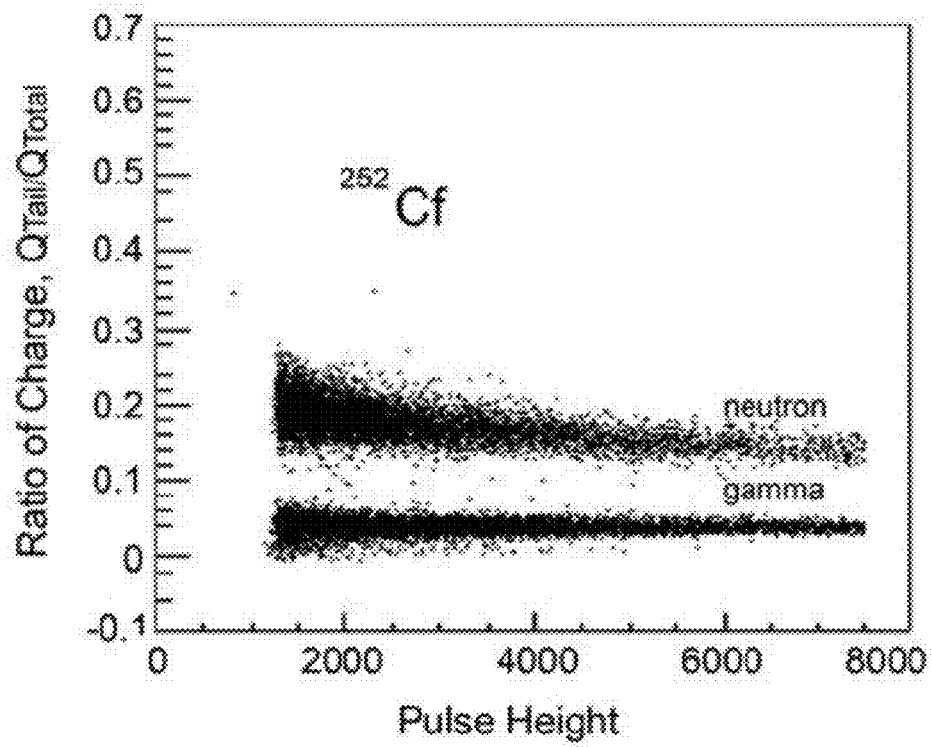
FIG. 2B shows a PSD pattern of a stilbene crystal obtained by digitized separation of neutron and gamma pulses according to one embodiment.
Figure 2C:
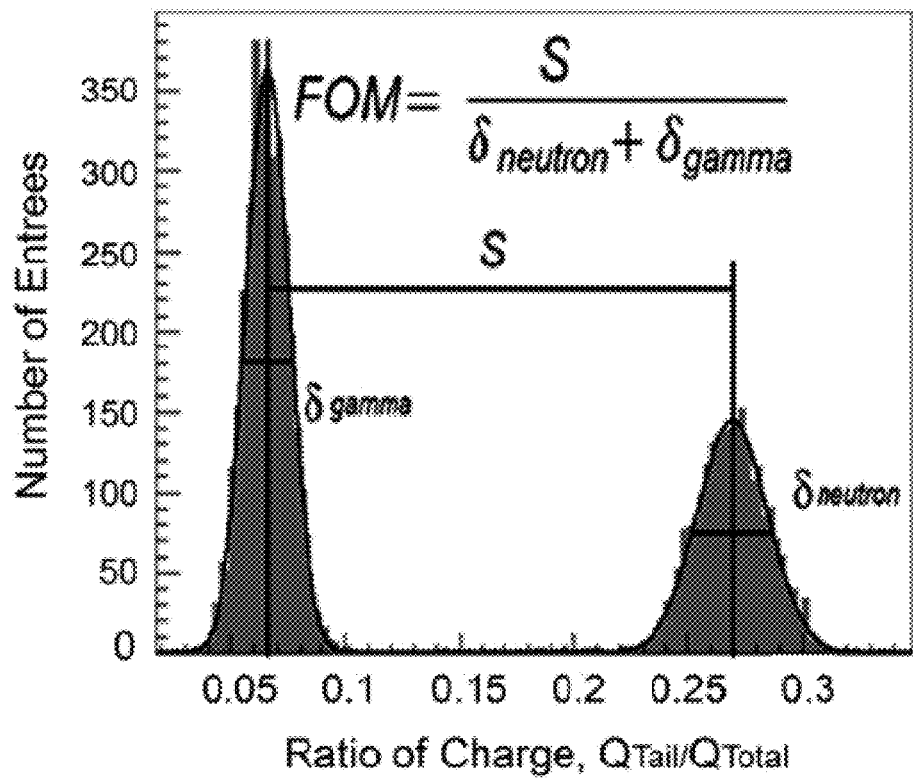
FIG. 2C shows PSD profiles of stilbene used for calculation of the PSD figure of merit (FOM) according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Further, as used herein, all percentage values are to be understood as percentage by weight (wt %), unless otherwise noted. Moreover, all percentages by weight are to be understood as disclosed in an amount relative to the bulk weight of an organic plastic scintillator material or a liquid scintillator material, in various approaches.

As also used herein, the term "about" when combined with a value refers to plus and minus 10% of the reference value. For example, a length of about 10 nm refers to a length of 10 nm±1 nm, a temperature of about 50° C. refers to a temperature of 50° C.±5° C., etc.

As additionally used herein, a material that is "optical transparent" refers to a material that is substantially free (e.g. >99% free, preferably >99.5% free) of grain boundaries, such that the material is homogenous (e.g. comprises one-phase). Moreover, optically transparent materials are those through which light propagates uniformly.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The following description describes several embodiments relating to the use and fabrication of Li-containing scintillator materials with distinctively different scintillation pulse shapes resulting from neutron and gamma excitation, respectively. Moreover, various embodiments of the present invention describe the fabrication of Li-containing scintillator materials capable of simultaneous detection of thermal neutrons and fast neutrons discriminated from the gamma radiation background.

Robust neutron radiation detectors with a large sensitive area/volume, high detecting efficiency and a low cost means of making/using are important for the detection of neutrons in many areas such as nuclear nonproliferation, international safeguards, national security, scientific research, etc. In particular, for nuclear nonproliferation, fast and robust methods for the identification of special nuclear materials (SNM) are needed.

According to their energy, neutrons are typically divided in two major groups: thermal (low-energy) neutrons and fast (high-energy) neutrons. Detection of both types requires the separation of the neutron signatures from the always-present strong gamma radiation background. In common radiation detection practice, identification of both thermal and fast neutrons requires simultaneous use of two different types of detectors, one of which is based on mostly hydrocarbon-comprised scintillators (for fast neutron detection), and the other including scintillating materials loaded with thermal neutron capture reagents.

Conventional detection of thermal neutrons utilizes $^3$He detectors, the availability of which is sharply decreasing due to the diminishing supply of $^3$He obtained as a side product of tritium production. Accordingly, $^{10}$B- and $^6$Li-loaded scintillating materials have been considered as possible replacements for $^3$He detectors. For example, some $^{10}$B-loaded liquid scintillators have been shown to discriminate signals from thermal neutrons, fast neutrons and gamma-rays.

$^6$Li possesses many desirable qualities as a neutron target. Among its important advantages are a reasonable capture cross section, relatively high photon yield from charged particles, and absence of gamma-rays in the final products resulting from a capture reaction $^6$Li+n$^o$=$^3$H+α+4.8 MeV. The majority of scintillators utilizing the thermal neutron detection properties of $^6$Li are inorganic single crystals or scintillation glasses. However, single crystal detectors are limited by the size of the crystals that can be grown and high costs associated with fabrication. Additionally, drawbacks of $^6$Li-loaded glass scintillators include long decay times and high sensitivity to gamma rays due to the presence of relatively heavy constituents in their compositions.

In some approaches, plastic scintillators offer a good alternative with wide field applications. Being comprised of low-Z materials, hydrocarbon-based plastics are less sensitive to gamma radiation. Additional advantages may be introduced in more approaches by the use of Pulse Shape Discrimination (PSD) formulations that enable separation of neutron signatures from gamma-radiation background. Moreover, plastics may be easily manufactured in different configurations and sizes, and are inexpensive. Further, unlike the handling constraints associated with liquid scintillators, plastic scintillators are easy to handle, thus enabling their use in portal monitoring, environmental radiation protection, and in field conditions with sharply changing temperatures, etc.

$^{10}$B-containing compounds, such as ortho- and meta-carboranes, may be easily introduced into the composition of plastic scintillators in various approaches. However, the use of such detectors may present difficulties because of the high cost required for isotopical enrichment of carboranes from ~19% of $^{10}$B in natural abundance to over 90% needed for the neutron capture probability.

The principle drawback that prevents the use of $^6$Li-loaded plastic scintillators relates to the difficulties in their preparation due to the lack of solubility of highly polar Li-containing compounds in non-polar aromatic matrices needed for efficient scintillation. Thus, the majority of current $^6$Li-containing organic scintillators are typically prepared as non-PSD dispersions of nano- or micro-particles of different Li-compounds in liquid or plastic matrices that often have insufficient optical clarity and chemical instability due to inhomogeneous composition and structure.

Embodiments disclosed herein overcome the aforementioned drawbacks by providing Li-containing compounds that may be homogeneously dissolved in an organic scintillator material (e.g. a polymer matrix, a liquid, etc.) such that the scintillator material is substantially (e.g. >99%, preferably >99.5%) free of grain boundaries (e.g. comprises a single phase, is homogenous, etc.) and is thus optically transparent. For example, it has been surprisingly found in some approaches that Li-salts of carboxylic aids with coordinating solvents may diminish the polarity of Li, thereby making the resulting Li-compound more soluble in non-polar aromatic matrices.

Following are several examples of general and specific embodiments of Li-containing scintillators configured for thermal neutron, fast neutron and gamma detection, and/or related systems and methods.

In one general embodiment, a thermal neutron capture reagent includes a lithium-containing compound selected from a group consisting of: Li-3-phenylsalicylate, Li-3,5-di-tert-butylsalicylate, Li-acetylsalicylic acid, and combinations thereof, where the lithium-containing compound is soluble in a fluor, and where the thermal neutron capture reagent exhibits an optical response signature for thermal neutrons.

In another general embodiment, a scintillator includes a scintillator material; a primary fluor, and a Li-containing compound, where the Li-containing compound is soluble in the primary fluor, and where the scintillator exhibits an optical response signature for thermal neutrons that is different than an optical response signature for fast neutrons and gamma rays.

In yet another general embodiment, a method for fabricating a scintillator includes forming a precursor mixture, and heating the precursor mixture until a polymerization process is complete. The precursor mixture includes a monomer, one or more fluors, a coordinating solvent, and a Li-containing compound selected from a group consisting of: Li-3-phenylsalicylate, Li—Li-3,5-di-tert-butylsalicylate, Li-acetylsalicylic acid, and combinations thereof, where the Li-containing compound is soluble in at least one of the one or more fluors.

General Scintillator-Based Radiation Detector System

Figure 3:
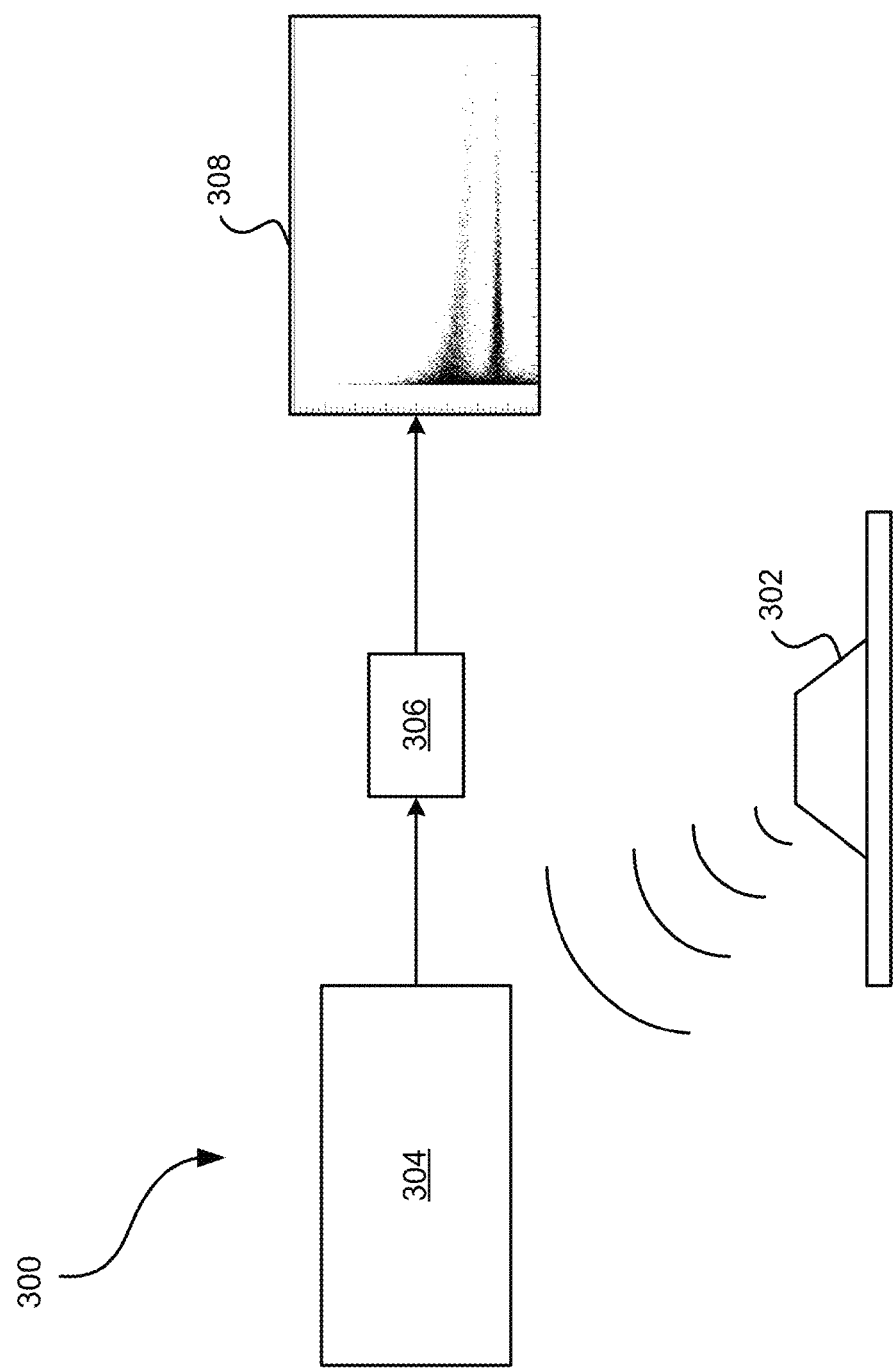
FIG. 3 shows a simplified layout of an instrument according to one embodiment.

FIG. 3 depicts a simplified spectroscopy system according to one embodiment. The system 300 comprises a scintillator material 302, such as of a type described herein, and which is referred to herein interchangeably as a scintillator. The system 300 also includes a photodetector 304, such as a photomultiplier tube or other device known in the art, which can detect light emitted from the scintillator 302, and detect the response of the material to at least one of neutron and gamma ray irradiation.

The scintillator 302 produces light pulses upon occurrence of an event, such as a neutron, a gamma ray, or other radiation engaging the scintillator 302. As the gamma ray, for example, traverses the scintillator 302, photons are released, appearing as light pulses emitted from the scintillator 302. The light pulses are detected by the photodetector 304 and transduced into electrical signals that correspond to the pulses. The type of radiation can then be determined by analyzing the integral of the light pulses and thereby identifying the gamma ray energy absorbed by the scintillator.

In some embodiments, the system 300 may be, further comprise, or be coupleable/coupled to, a preamplifier and/or digitizer (not shown in FIG. 3). Additionally, a processing device 306 for processing pulse traces output by the photodetector 304. In other embodiments, the system 300 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 308 in any form, such as in a histogram or derivative thereof.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

Polymers

The organic, plastic scintillators as described in the embodiments disclosed herein may include any suitable polymer matrix as the plastic component. Particularly suitable plastic scintillators are those that include rigid, durable, transparent plastics that possess aromatic or non-aromatic structures and are capable of supporting high concentrations of fluors (e.g. primary fluors, secondary fluors, tertiary fluors, etc.) therein. In some embodiments, suitable plastic scintillators may be capable of supporting a total concentration of the fluors in a range from about 3-75 wt % fluor.

In one embodiment, the polymer matrix may comprise polyvinyltoluene (PVT). Similar polymers may be utilized in other embodiments, such as polystyrene (PS), polymethylmethacrylate (PMMA), polyvinyl xylene (PVX), polymethyl, 2,4-dimethyl, 2,4,5-trimethyl styrenes, polyvinyl diphenyl, polyvinyl naphthalene, polyvinyl tetrahydronaphthalene polymers, other complex aromatic polymers, and certain non-aromatic polymers capable of solubilizing different scintillating fluors, etc. as would be understood by one having ordinary skill in the art upon reading the present disclosure.

Suitable polymers, as used herein in preferred approaches, may be at least 50% light transmissive in a wavelength of interest, e.g. a wavelength emitted by one or more fluors present in the organic plastic scintillator system.

In various embodiments, the organic, plastic scintillator material may comprises a colorless, optically transparent non-PSD plastic material for detection of thermal neutrons via pulse height measurements. In further embodiments, the organic, plastic scintillator may comprise a colorless, optically transparent PSD plastic for simultaneous detection of thermal and fast neutrons discriminated from gamma radiation background via PSD measurement techniques.

In more embodiments, the polymer may be provided as a liquid polymer matrix, a non-liquid polymer matrix, a dry powder, etc. as would be understood by one having ordinary skill in the art upon reading the present descriptions. Moreover, in some approaches the polymer matrix may include aromatic functional groups, such as phenyl groups, among others.

In yet more embodiments, the organic, plastic scintillator material may be fabricated and comprise the polymers as described in U.S. patent application Ser. No. 13/437,836, Apr. 4, 2012, and U.S. patent application Ser. No. 13/471,259, filed May 14, 2012, which are both incorporated herein by reference in their entirety.

Liquids

The organic, liquid scintillators as described in the embodiments disclosed herein may include any suitable liquid scintillator material. For example, a suitable liquid scintillator material may be any commercially available liquid scintillator material comprising known flammable and non-flammable formulations. Suitable liquid scintillator materials may include but are not limited to EJ-301, EJ-309, EJ-315, BC-501A, NE-213, etc.

In another approach the liquid scintillators disclosed herein may include aromatic solvents such as xylene, toluene, PXE [1,2-dimethyl-4-(1-phenylethyl)-benzene], LAB (linear alkyl benzene), DIPN (diisopropylnaphthalene), etc. In yet another approach, the liquid scintillators may include non-aromatic solvents such as methanol, ethanol, dioxanes, DME (dimetoxyethane), etc. In more approaches, the liquid scintillators may include mixed organic-inorganic solvents combined with solubilized scintillating fluors, as would be understood by one having ordinary skill in the art upon reading the present disclosure.

In still more approaches, the liquid scintillator material may be any commercial scintillator material without PSD.

In other approaches, the liquid scintillator material may be any commercial scintillator material with PSD. For instance, in one approach, the liquid scintillator materials disclosed herein may comprise any organic, inorganic or mixed solvents capable of dissolving one or more fluors (e.g. primary fluors, secondary fluors, tertiary fluors, etc.) therein. In further approaches, the concentrations of the one or more fluors in the liquid scintillator material may be tailored to achieve a sufficient and/or a desired amount of scintillation light yield (LY) and/or PSD production. In even more approaches, the concentration of the one or more fluors in the liquid scintillator material that is sufficient to achieve PSD production may be about 2 to about 3 orders of magnitude lower than the concentration of the same one or more fluors needed in plastic scintillators to achieve the same level of PSD production.

Fluors/Dyes

Primary fluors suitable for use in the presently disclosed scintillator systems include any fluor that may be known in the art and capable of exhibiting characteristics for scintillation as described herein. In some embodiments, the primary fluor may be present in various concentrations, e.g. about 0.005-5 wt % or more. In more embodiments, the primary dye may be present in an amount ranging from about 5% to 20 wt % or more. In even more embodiments, the primary dye may be present in an amount ranging from about 20 wt % to about 75 wt %, or an amount ranging from about 30 wt % to about 75 wt %. As disclosed herein in various embodiments, the concentrations of fluors are described relative to a weight of the bulk scintillator material.

In one particular embodiment, a scintillator system may include a primary fluor disposed in a polymer matrix. In some approaches, the primary fluor may be a fluorescent dye present in an amount of 3-5 wt % or more, where such fluorescent dye results in the scintillator material exhibiting an optical response signature for neutrons that is different than an optical response signature for gamma rays.

In approaches where one or more primary fluors are present in high concentration in the exemplary organic plastic scintillator systems, the solubility of the fluor(s) in the polymer matrix is preferably high. For example, in one embodiment, the polymer matrix may be characterized as having a solubility of about 3-5 wt % or more with respect to a particular fluor.

The primary fluor may be incorporated into the polymer matrix according to any suitable mechanism. For example, in some approaches, the primary fluor may be suspended/dispersed in the polymer matrix. In preferred approaches, there may be a substantially uniform distribution of the primary fluor in the polymer matrix. In more approaches, the primary fluor may be crosslinked to the polymer matrix. In still more approaches, the primary fluor may be copolymerized with the polymer matrix, and/or with another component of the polymer matrix, etc. as would be understood by one having ordinary skill in the art upon reading the present descriptions. Of course, other arrangements of fluor and polymer matrix may be utilized without departing from the scope of the present descriptions.

In another particular embodiment, a scintillator system may include a primary fluor disposed in a liquid scintillator material. In some approaches, the primary fluor may be a fluorescent dye present in an amount of 0.005% wt % or more, where such fluorescent dye results in the scintillator material exhibiting an optical response signature for neutrons that is different than an optical response signature for gamma rays.

In yet another embodiment, the primary fluor disposed in an organic plastic scintillator material and/or a liquid scintillator material may be 2,5-diphenyl oxazole (PPO). In other embodiments, the primary fluor may include other dyes that produce scintillation response upon the excitation by any types of radiation. In still other approaches, the primary fluor may include multiple fluorescent dyes.

In a further embodiment, a scintillator system may include a secondary fluor disposed therein. For instance, in one approach, a suitable secondary fluor disposed in the exemplary plastic scintillator systems and/or the exemplary liquid scintillator systems disclosed herein may be characterized by wavelength-shifting qualities. In some approaches, a plastic and/or liquid scintillator system having a secondary fluor in the presence of another fluor, particularly a primary fluor, may exhibit scintillation light yield (LY) or PSD characteristics that are superior to the LY or PSD characteristics of a scintillator system having exclusively the same primary fluor (and no secondary fluor), under otherwise identical conditions.

Suitable secondary fluors may include any fluor characterized by wavelength-shifting such as diphenyl anthracene (DPA), tetraphenyl butadiene (TPB) 1,1,4,4-tetraphenyl-1,3-butadiene, 1,4-Bis(5-phenyl-2-oxazolyl)benzene (POPOP), p-bis(o-methylstyryl)benzene, 1,4-bis-2-(4-methyl-5-phenyloxazolyl)benzene, 2,2'-p-phenylenebis(5-phenoxazole), diphenylstilbene, 1,3,5-triaryl-2-pyrazolines, 4-(n-butylamino)-2-(4-methoxyphenyl)benzo[b]pyrylium perchlorate, sodium salicylate, 1,4-bis(2-methylstyryl)benzene (Bis-MSB), 7-dimethylamino-4-methyl-2-quinoline, 7-amino-4-methylcoumarin, 4,6-dimethyl-7-ethylamino coumarin, etc., or other such suitable second fluors as would be understood by one having ordinary skill in the art upon reading the present descriptions. Particularly preferred secondary fluors may include DPA, TPB, POPOP, and Bis-MSB according to various embodiments.

According to some approaches, the exemplary organic plastic scintillators and/or organic liquid scintillators may include a secondary fluor in a low concentration in order to maximize the beneficial wavelength-shifting effects for PSD performance. For example, the secondary fluor may be present in an amount of about 2 wt % or less, in one embodiment.

Li-Containing Compound

The scintillators disclosed herein (e.g. organic plastic scintillators; organic liquid scintillators) may include a Li-containing compound. In approaches including organic, plastic scintillator systems, suitable Li-containing compounds are those which may be homogenously dissolved in a polymer matrix (e.g. an aromatic polymer matrix, a non-aromatic polymer matrix, etc.), such that the scintillator material is substantially free (e.g. >99% free, preferably >99.5% free) of grain boundaries, comprises one phase, and is optically transparent, in some embodiments. In approaches including liquid scintillator systems, suitable Li-containing compounds are those which may be homogenously dissolved in a liquid scintillator material (e.g. an aromatic liquid, a non-aromatic liquid), such that the scintillator comprises one phase and is optically transparent.

In one embodiment, the Li-containing compound may be present in an amount ranging from about 0.01 wt % to about 20 wt %. In another embodiment, the Li-containing compound may be present in an amount ranging from about 0.01 wt % to about 1.5 wt %.

In additional embodiments, the Li-containing compound may be a Li-salt of a carboxylic acid. For example, a suitable Li-containing compound may be Li-3-phenylsalicylate, an exemplary formation of which is reproduced below:

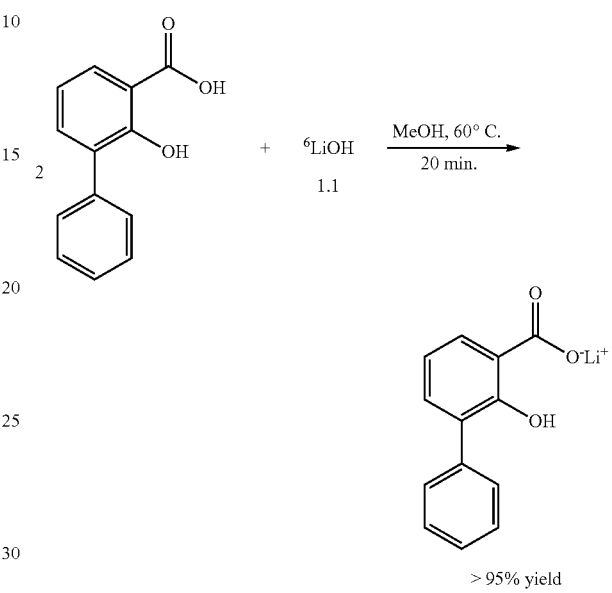

> 95% yield

While the above process shows purified 3-phenylsalicylic acid reacted with a $^6$LiOH reagent, other Li-containing reagents may be used such as a Li-metal, $Li_2CO_3$, LiCl, etc. Moreover, the formation of suitable Li-containing compounds may include combining any suitable carboxylic acid with a Li-containing reagent, as would be understood by one having skill in the art upon reading the present disclosure.

In more embodiments, the Li-containing compounds may include, but are not limited to, Li-acetylsalicylic acid, Li-3,5-di-tert-butylsalicylate, other Li-containing derivatives of salicylic and benzoic acids, lithium benzoate, Li-oxazolecarboxylates, and other such Li-containing compounds as would be understood by one having skill in the art upon reading the present disclosure.

In yet more embodiments, the Li-containing compounds may include substituents that promote hydrogen bonding and/or stability with a coordinating solvent (examples of which are provided below). In further embodiments, the Li-containing compounds may also include non-polar groups to promote solubility in the aromatic polymer matrix of the plastic scintillators and/or in the aromatic liquid scintillator materials of the liquid scintillators disclosed herein.

In particular embodiments, the Li-containing compound may be soluble in a primary fluor present within the plastic scintillators and/or liquid scintillators described herein. For instance, in some approaches, the Li-containing compound may be soluble in a primary fluor, such as biphenyl, naphthalene, PPO and/or other derivatives of oxazole, etc. In more approaches, the Li-containing compound may be soluble in a primary fluor present at ≤1 wt %. In still more approaches, the Li-containing compound may be soluble in a primary fluor present at about 0.5-10 wt % or more, an amount ranging from about 10 wt % to about 30 wt %, an amount ranging from about 30 wt % to about 75% wt %, etc.

Coordinating Solvents

In some embodiments, the organic plastic scintillators and/or the organic liquid scintillators disclosed herein may comprise a Li-containing compound, such as those described above, and a coordinating solvent, where the Li-containing compound is soluble in the coordinating solvent.

In one embodiment, the coordinating solvent may be 1,2-dimethoxyethane (DME). Other polar aprotic solvents may be employed in other embodiments, e.g. to facilitate the introduction of Li-containing compounds into polymer matrices and/or liquid scintillator materials. Exemplary polar aprotic solvents may include but are not limited tetrahydrofuran (THF), acetonitrile (MeCN), triethylamine (TEA), acetone, ethers, nitriles, amines, ketones, etc., and other known highly coordinating solvents.

In more embodiments, the coordinating solvent may be a polar protic solvent, such as methanol or isopropanol. However, as compared to polar protic coordinating solvents, polar aprotic coordinating solvents may have a higher affinity for the scintillating dyes and therefore result in plastic and/or liquid scintillators that are more stable.

In yet more embodiments, the coordinating solvent may be miscible with aromatic (e.g. non-polar and polar) and non-aromatic (e.g. non-polar and polar) compounds comprising the polymer matrix and/or the liquid scintillator materials described herein.

In further embodiments, the coordinating solvent may be present in an amount ranging from about 0.01 wt % to about 50 wt %.

In other embodiments, dissolution of the Li-containing compound in the coordinating solvent may result in the formation of an amorphous gel. For example, in one approach, $^6$Li-3-phenylsalicylate may be dissolved in excess 1,2-dimethoxyethane (DME) and the resulting solution left to evaporate slowly, thereby a forming a non-polar amorphous gel, as shown below:

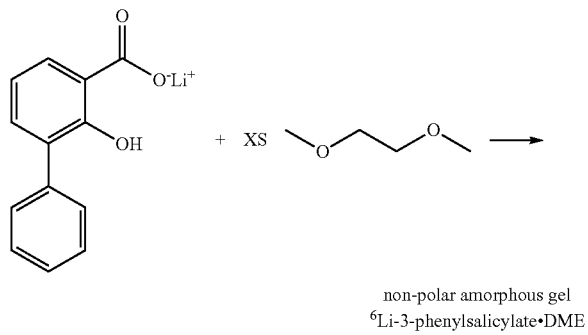

non-polar amorphous gel
$^6$Li-3-phenylsalicylate•DME

The resulting amorphous gel may be soluble in known aromatic and nonaromatic monomer-based solution mixtures used for the preparation of organic plastic scintillators, such as those disclosed herein. Similarly, the resulting amorphous gel may also be soluble in known aromatic and nonaromatic liquid scintillator materials used for preparation of liquid scintillators, such as those disclosed herein.

Initiators and Cross-Linkers

In some embodiments, the scintillators disclosed herein may also comprise an polymerization initiator and/or a cross-linker. Suitable polymerization initiators may include, but are not limited to, organic peroxides, Luperox 231, etc. or other such initiators as would be understood by one having skill in the art upon reading the present disclosure. Suitable cross-linkers may include, but are not limited to, aromatic cross-linkers such divinyl benzene, divinyl toluene, trivinyl benzene, divinyl naphthalene, etc.; aliphatic cross-linking monomers such as di- and polyacrylates and methacrylates, etc; and other such cross-linkers as would be understood by one having skill in the art upon reading the present disclosure.

In additional embodiments, the initiator may be present in an amount ranging from about 0.001 wt % to about 1 wt %. In further embodiments, the cross-linker may be present in an amount ranging from about 0.05 wt % to about 5 wt %.

SCINTILLATOR FABRICATION EXAMPLES

Several illustrative examples for fabricating non-PSD scintillators capable of detecting thermal neutrons, and PSD scintillators capable of simultaneously detecting thermal and fast neutrons discriminated from gamma radiation background, are described below. It is important to note that these illustrative fabrication methods are in no way limiting, and are provided by way of example only.

Example 1

General Method for Fabricating Plastic and/or Liquid Scintillators

Figure 4:
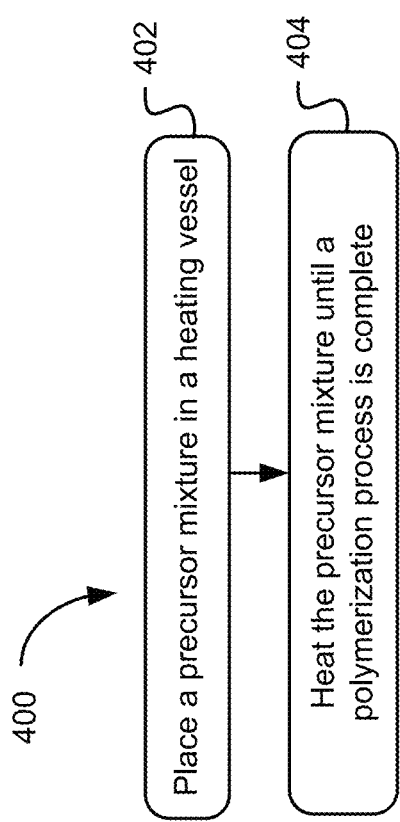
FIG. 4 shows a flowchart of a method of fabricating a scintillator according to one embodiment.

FIG. 4 depicts a method 400 of fabricating a plastic scintillator according to one embodiment. As an option, the present method 400 may be implemented to form the scintillators disclosed herein, such as those shown in the other FIGS. Further, the method 400 may be carried out in any desired environment. Moreover, more or less operations than those shown in FIG. 4 may be included in method 400, according to various embodiments. It should also be noted that any of the aforementioned features may be used in any of the embodiments described in accordance with this method and others disclosed herein.

As shown in FIG. 4, a scintillator precursor mixture may be placed in a heating vessel, and subsequently heated until a polymerization process has completed. See operations 402 and 404, respectively.

In one embodiment, the precursor mixture may include a monomer, one or more fluors, a coordinating solvent, and a Li-containing compound, wherein the Li-containing compound is soluble in the coordinating solvent and/or at least one of the one or more fluors.

In some approaches, the monomer may be capable of polymerizing and solvating the one or more fluors. In one particular approach, the monomer may comprise one or more aromatic groups. In another approach, the monomer may be nonaromatic. In yet another approach, the monomer may be non-polar. In a further approach, the monomer may be polar. In particular approaches, the monomer may comprise at least one of a 4-methylstrene, a vinyltoluene, a styrene, a methylmethacrylate precursor, and any other such monomer as would be understood by one having skill in the art upon reading the present disclosure.

In various approaches, the one or more fluors may comprise a primary fluor and a secondary fluor, where the secondary fluor has a longer wavelength than the primary fluor. In one particular approach, the primary fluor may be PPO. In another approach, the secondary fluor may be at least one of 9,10-diphenylanthracene, and p-bis-(o-methylstyryl)-benzene. In yet another approach, the primary and second fluor may be any suitable flour as described herein.

In more approaches, the Li-containing compound may be a Li-salt of carboxylic acid. In other approaches, the Li-containing compound may include at least one of Li-3-phenylsalicylate, Li-3,5-di-tert-butylsalicylate, Li-acetylsalicylic acid, derivatives of lithium benzoate, derivatives of Li-oxazolecarboxylate, etc.

In still more approaches, the coordinating solvent may be 1,2-dimethoxymethane or any suitable coordinating solvent as described herein. In preferred approaches, there may be a homogenous distribution of the Li-containing compound in the resulting scintillator.

In even more approaches, the precursor mixture may further include at least one of an initiator (e.g. Luperox 231) and a cross-linker (e.g. divinylbenzene).

After the scintillator precursor mixture has been placed in the heating vessel, and subsequently heated until a polymerization process has completed (e.g. operations 402 and 404), the resulting scintillator may exhibit an optical response signature for thermal neutrons that is different than an optical response signature for fast neutrons and gamma rays in various approaches. Moreover, the resulting scintillator may be substantially free of grain boundaries (e.g. it is homogenous) and optically transparent in preferred approaches.

Figures 10A, 10B:
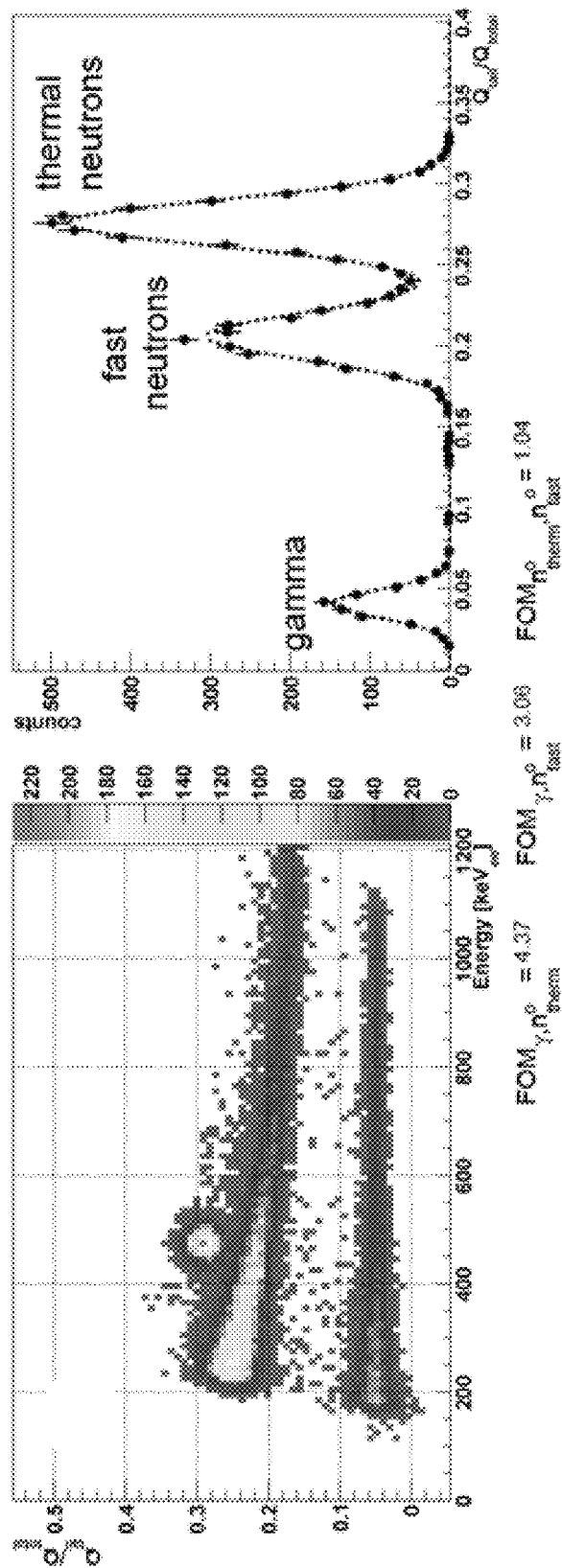
FIG. 10A shows energy-calibrated PSD patters for a liquid scintillator prepared as a mixture of 1% DPA in xylene loaded with 5% Li-3-PSA measured using a $^{252}$Cf source with 5 cm HDPE moderation.
FIG. 10B shows the PSD profile corresponding to FIG. 10A in the near-thermal-neutron-spot energy range showing the high degree of separation between three types of radiation.
Figures 11A, 11B, 11C, 11D:
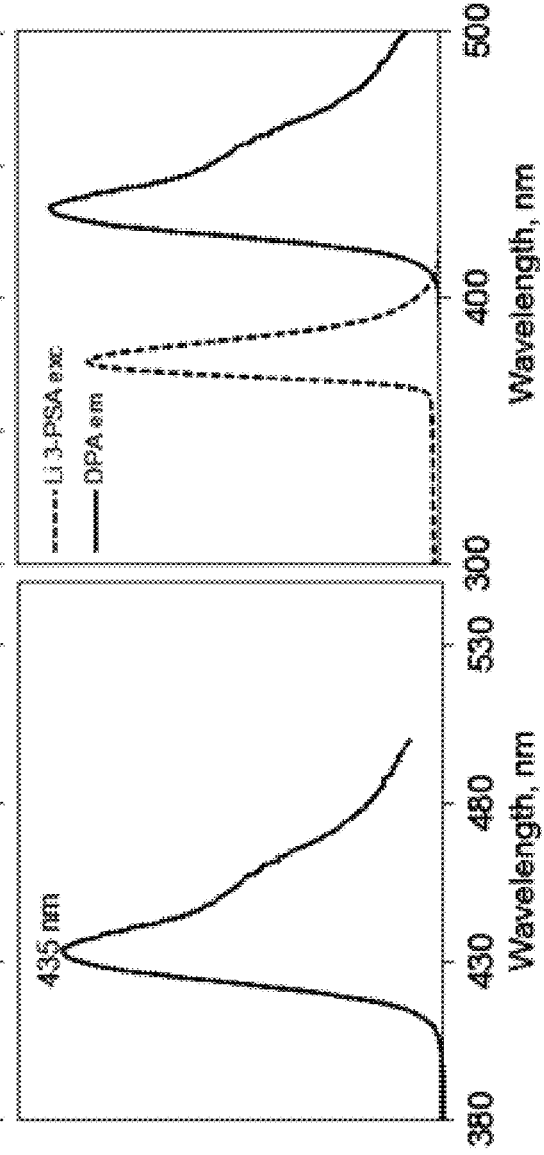
FIG. 11A shows the emission spectrum of a $^6$Li-loaded liquid scintillator comprising a mixture of 30% PPO and 5% Li-3-PSA dissolved in p-xylene, where the spectrum corresponds to pure Li-3-PSA emission.
FIG. 11B shows Li-3-PSA excitation and PPO emission spectra showing large overlap that leads to the absorption of PPO emission by Li-3-PSA molecules.
FIG. 11C shows the emission spectrum of a mixture containing 1% DPA and 5% Li-3-PSA, where the final emission is produced by DPA molecules.
FIG. 11D shows Li-3-PSA excitation and DPA emission spectra with no spectral overlap.

Fabrication of Li-loaded liquid scintillators may be formed utilizing a method similar to method 400. For example, in some approaches. Li-containing complexes of carboxylic acids with coordinating solvents may be used for introduction of Li into the composition of liquid scintillators materials. In approaches where a liquid scintillator material with traditional fast neutron/gamma discrimination is used, incorporation of Li may add additional functionality for detection of thermal neutrons discriminated from gamma radiation and fast neutrons (e.g. as shown in FIG. 10B). With the use of a liquid scintillator material without PSD, thermal neutrons may be detected from a pulse height spectrum. Accordingly, utilizing Li-containing complexes of carboxylic acids with coordinating solvents to introduce Li into the composition of liquid scintillators material, may be used to commercially produce liquid scintillators with and without PSD having both traditional and non-flammable formulations.

Example 2

Non-PSD Plastic Scintillators

In one embodiment, colorless, optically transparent non-PSD plastic scintillators were fabricated from:
about 0.001-1 wt % Luperox 231 (initiator);
about 0.5-5 wt % 2,5-diphenyloxazole (PPO), as a primary fluor;
about 0.1-2.0 wt % of a longer-wavelength compound, such as 9,10-diphenylanthracene (DPA), or p-bis-(o-methylstyryl)-benzene (BisMSB), as a secondary fluor;
about 0.01-5 wt % $^6$Li-3-phenylsalicylate, as a thermal neutron capture reagent;
about 0.01-5 wt % 1,2-dimethoxyethane (DME), for dissolution of the polar lithium salt into the non-polar plastic matrix;
about 0.05-5 wt % divinylbenzene, as a cross-linker for added stability; and
balance 4-methylstrene, styrene, or methylmethacrylate precursor.

The process of forming the above non-PSD plastic scintillators was conducted under oxygen-free conditions in a nitrogen-filled or argon-filled glovebox or in tightly sealed vessels. This process included combining the $^6$Li-3-PSA and DME to form a first solution; and combining the monomer, the primary fluor, and the second fluor to form a second solution. The first and second solutions were both gently heated until the first and second solutions were completely dissolved.

The first and second solutions were next combined to form a third solution, followed by addition of the initiator and crosslinker to the third solution. The third solution was added to a scintillation vial or glass jar that was degassed prior to entrance into the glovebox. Subsequently, the vessel was sealed and placed in an oven at about 50-55° C. under inert gas flow. The sealed vessel was allowed to cure undisturbed for about 144 hours, followed by a final curing step at about 70-75° C. overnight; after which, the resulting plastic scintillator was cooled to room temperature and removed from the vessel. The resulting plastic scintillator was rigid, homogenous transparent and exhibited scintillation detection properties for thermal neutron by at least pulse-height measurements.

FIGS. 5A and 5B illustrate neutron signatures obtained with the above $^6$Li-containing non-PSD plastics scintillators using moderated $^{252}$Cf source. Specifically, FIG. 5A shows the fraction of delayed light ($Q_S$) in a total scintillation pulse ($Q_T$) for the non-PSD plastic; whereas FIG. 5B shows the pulse height spectrum of the non-PSD plastic with a peak corresponding to the presence of neutrons.

Example 3

PSD Plastic Scintillators

In one embodiment, a colorless, optically transparent PSD plastic scintillator were fabricated from:
about 0.001-1 wt % Luperox 231 (initiator);
about 25-30 wt % 2,5-diphenyloxazole (PPO), as a primary fluor;
about 0.1-2.0 wt % of a longer-wavelength compound, such as 9,10-diphenylanthracene (DPA), or p-bis-(o-methylstyryl)-benzene (BisMSB), as a secondary fluor;
about 0.01-10 wt % $^6$Li-3-phenylsalicylate, as a thermal neutron capture reagent;
about 0.01-5 wt % 1,2-dimethoxyethane, for dissolution of the polar lithium salt into the non-polar plastic matrix;
about 0.05-5 wt % divinylbenzene, as a cross-linker for added stability; and
balance 4-methylstrene, styrene, or methylmethacrylate precursor.

The process of forming the above PSD plastic scintillators was conducted under oxygen-free conditions in a nitrogen-filled or argon-filled glovebox or in tightly sealed vessels. This process included combining the $^6$Li-3-PSA and DME to form a first solution; and combining the monomer, the primary fluor, the second fluor to form a second solution. The first and second solutions were both gently heated until the first and second solutions were completely dissolved.

The first and second solutions were next combined to form a third solution, followed by addition of the initiator and crosslinker to the third solution. The third solution was added to a scintillation vial or glass jar that was degassed prior to entrance into the glovebox. Subsequently, the vessel was sealed and placed in an oven at about 50-55° C. under inert gas flow. The sealed vessel was allowed to cure undisturbed for about 144 hours, followed by a final curing step at about 70-75° C. overnight; after which, the resulting plastic scintillator was cooled to room temperature and removed from the vessel. The resulting plastic scintillator was rigid, homogenous, and transparent and exhibited scintillation detection properties for thermal neutrons and fast neutron discriminated from gamma radiation background by at least pulse shape discrimination measurements.

FIGS. 5C and 5D illustrate neutron signatures obtained with the above $^6$Li-containing PSD plastics scintillators using moderated $^{252}$Cf source. Specifically, FIG. 5C shows the fraction of delayed light (Qs) in a total scintillation pulse (Qr) for the PSD plastic; whereas FIG. 5D shows the pulse height spectrum of the non-PSD plastic with separated signatures of neutrons and gammas.

Example 4

Non-PSD Liquid Scintillators

In one embodiment, non-PSD liquid scintillators were fabricated from:
  about 0.5 wt % 2,5-diphenyloxazole (PPO), as a primary fluor;
  about 0.01 wt % of a longer-wavelength compound, such as 9,10-diphenylanthracene (DPA), or p-bis-(o-methylstyryl)-benzene (BisMSB), as a secondary fluor;
  about 0.01-10 wt % $^6$Li-3-phenylsalicylate, as a thermal neutron capture reagent;
  about 0.01-5 wt % 1,2-dimethoxyethane, for dissolution of the polar lithium salt into the non-polar plastic matrix.

In another embodiment, non-PSD liquid scintillator were fabricated from:
  any commercial liquid scintillator without PSD;
  about 0.01-10 wt % $^6$Li-3-phenylsalicylate, as a thermal neutron capture reagent;
  about 0.01-5 wt % 1,2-dimethoxyethane, for dissolution of the polar lithium salt into the non-polar plastic matrix.

The process of forming the above non-PSD liquid scintillators was conducted under oxygen-free conditions in a nitrogen-filled or argon-filled glovebox or in tightly sealed vessels. This process included combining the $^6$Li-3-PSA and DME to form a first solution; and combining the liquid scintillator material, the primary fluor, the second fluor to form a second solution. The first and second solutions were both gently heated until the first and second solutions were completely dissolved. The first and second solutions were next combined to form a third solution, followed by addition of the third solution to a scintillation vial or glass jar that was degassed prior to entrance into the glovebox. The resulting liquid scintillator was transparent, homogenous and exhibited scintillation detection properties for thermal neutrons by at least pulse height measurements.

Example 5

PSD Liquid Scintillators

In one embodiment, PSD liquid scintillators were fabricated from:
  about 20 wt % 2,5-diphenyloxazole (PPO), as primary fluor;
  about 0.1-2.0 wt % of a longer-wavelength compound, such as 9,10-diphenylanthracene (DPA), or p-bis-(o-methylstyryl)-benzene (BisMSB), as secondary fluor;
  about 0.01-10 wt % $^6$Li-3-phenylsalicylate, as a thermal neutron capture reagent;
  about 0.01-5 wt % 1,2-dimethoxyethane, for dissolution of the polar lithium salt into the non-polar plastic matrix.

In another embodiment. PSD liquid scintillators were fabricated from:
  any commercial liquid scintillator with PSD (e.g. EJ-301, EJ-309, etc.);
  0.01-10% $^6$Li-3-phenylsalicylate, as a thermal neutron capture reagent;
  0.01-5% 1,2-dimethoxyethane, for dissolution of the polar lithium salt into the non-polar plastic matrix.

Forming the above PSD liquid scintillators was conducted under oxygen-free conditions in a nitrogen-filled or argon-filled glovebox or in tightly sealed vessels. This process included combining the $^6$Li-3-PSA and DME to form a first solution; and combining the liquid scintillator material, the primary fluor, the second fluor to form a second solution. The first and second solutions were both gently heated until the first and second solutions were completely dissolved. The first and second solutions were next combined to form a third solution, followed by addition of the third solution to a scintillation vial or glass jar that was degassed prior to entrance into the glovebox. The resulting liquid scintillator was transparent, homogenous and exhibited scintillation detection properties for thermal neutrons and fast neutron discriminated from gamma radiation background by at least pulse shape discrimination measurements.

It is important to note that the above fabrication methodologies in Examples 1-5 are illustrative and non-limiting. For instance, organic plastic scintillator systems comprising a polymer matrix other than poly4-methylstrene, polystyrene, or poly(methylmethacrylate); fluors other than DPA/PPO; Li-containing compounds other than $^6$Li-3-phenylsalicylate; and/or coordinating solvents other than DME; and/or initiators and cross-linkers other than Luperox 231 and divinylbenzene, respectively, may be fabricated under similar conditions, while taking account for slight variations (e.g. to temperature, incubation time, amount of respective components, etc.) as would be understood by a skilled artisan reading the present descriptions. Likewise, the organic liquid scintillator systems may comprise fluors other than DPA/PPO; Li-containing compounds other than $^6$Li-3-phenylsalicylate; and/or coordinating solvents other than DME may be fabricated under similar conditions while also taking account for slight variations.

Experimental Results

All experiments described below were conducted with the Li-salt of 3-phenylsalicylic acid (Li-3-PSA). A choice of this compound was made based on the properties that allowed for its dissolution in both liquid and plastic aromatic matrices.

Li-3-PSA may be synthesized in variety of ways using 3-phenylsalicylic acid (3-PSA) and different Li-containing compounds, such as Li-metal, Li$_2$CO$_3$, LiCl, etc. In the experiments described below, Li-3-PSA was obtained as a product of a neutralization reaction conducted in MeOH between 3-PSA (TCI America) and lithium hydroxide, LiOH (Aldrich):

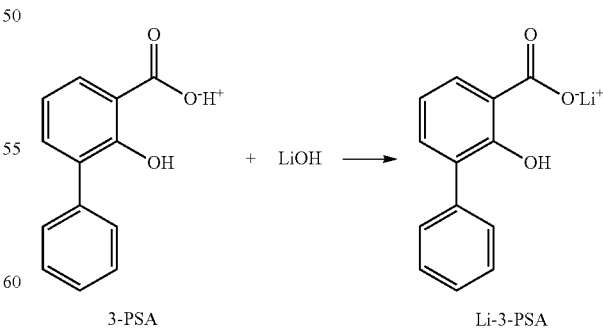

3-PSA                      Li-3-PSA

Liquid scintillators were prepared in p-xylene solutions, while polystyrene (PS) was used as a matrix for the preparation of plastics. All procedures with liquid or plastic preparations were conducted under oxygen-free conditions in an Ar-filled glove box or in tightly sealed vessels. To facilitate efficient PSD, high concentration of the primary dye (30 weight % of 2,5-diphenyloxazole, PPO) was used in combination with 0.2% of a secondary dye (9,10-diphenylanthacene, DPA or 1,4-Bis-2-methylstyryl-benzene, Bis-MSB), in both liquid and plastic mixtures. Li-3-PSA, dissolved in a small amount of 1,2-dimethoxyethane (DME), was added to liquid scintillator mixtures in the amount from 5% to 10% to the total weight of the scintillator. The same fraction of Li-3-PSA was introduced into the styrene-monomer mixture prior to the polymerization conducted according to a modified procedure used for the standard PSD plastic production.

Photoluminescence (PL) spectra were measured under UV excitation using a commercial Spex Fluoromax-2 spectrometer. Neutron detection properties of samples were studied using a $^{252}$Cf source shielded with 5.1 cm of lead, to irradiate samples coupled to Hamamatsu R6231-100-SEL photomultiplier tube (PMT). Gamma-equivalent energy calibration was made based on the position of the Compton edge in the $^{137}$Cs spectra, in which 500 keVee was defined by 50% of the Compton edge peak. High density polyethylene (HDPE) moderation was used to obtain a flux of thermal neutrons from the $^{252}$Cf source. The signals collected at the PMT anode were recorded using a 14-bit high-resolution waveform CompuScope 14200 digitizer with a sampling rate of 200 MS/s, for offline analysis.

The waveforms were numerically integrated over two time intervals: $\Delta t_{Total}$ and a subinterval $\Delta t_{Tail}$, corresponding to the total charge ($Q_{Total}$) and the delayed component ($Q_{Tail}$) of the signal, respectively. The value of the ratio of charge $R=Q_{Tail}/Q_{Total}$ for the two time intervals indicated whether the considered event was likely produced by a neutron (high R value) or a gamma ray (small R value). Quantitative evaluation of PSD was made using Figures of Merit $FOM=S/(\delta_1+\delta_2)$, where S is the separation between the peaks corresponding to different types of radiation, and $\delta_1$ and $\delta_2$ are full width at half maxima (FWHM) of the corresponding peaks. The time gates used for PSD measurements were optimized to maximize figures of merit for each composition with different decay characteristics. It should be noted that, since the reported scintillators exhibited triple signatures corresponding to thermal neutrons, fast neutrons, and gammas, corresponding FOMs were calculated not only for the total neutron/gamma discrimination, but considered separately for fast-neutron/gamma, thermal-neutron/gamma, and thermal/fast neutron discrimination using multiple Gaussian approximation from a fitted function of the data corresponding to each type of radiation.

The decay characteristics were measured using time correlated single photon counting based on digitized signals from a tightly coupled, i.e. "start time", PMT (H3378-50) which responds to a significant fraction of the photons and a loosely coupled PMT (H5783P) which responds to, on average, much fewer than 1 photon per Compton scatter. Signals were digitized at 2.5 GS/s using a PicoScope 6404B USB Oscilloscope. The difference in peak times, as determined with subsample interpolation, for each start/stop pair was added to a histogram. The prompt region of the resulting decay, after the resolution-smeared peak, was fitted with an exponential to measure the prompt decay characteristics.

Thermal neutron capture efficiency was calculated by MCNPX simulation using neutron capture ion algorithm (NCIA). Scintillator of specific composition was exposed to thermal neutron flux (25 meV) incident on detector with the original direction along the detector axis. Pulse height tally (f8) for one of the reaction fragments, tritium, was used to account for a neutron being captured and tritium depositing its energy to the scintillator.

Experimental Results

Plastic Scintillators

Figure 6:
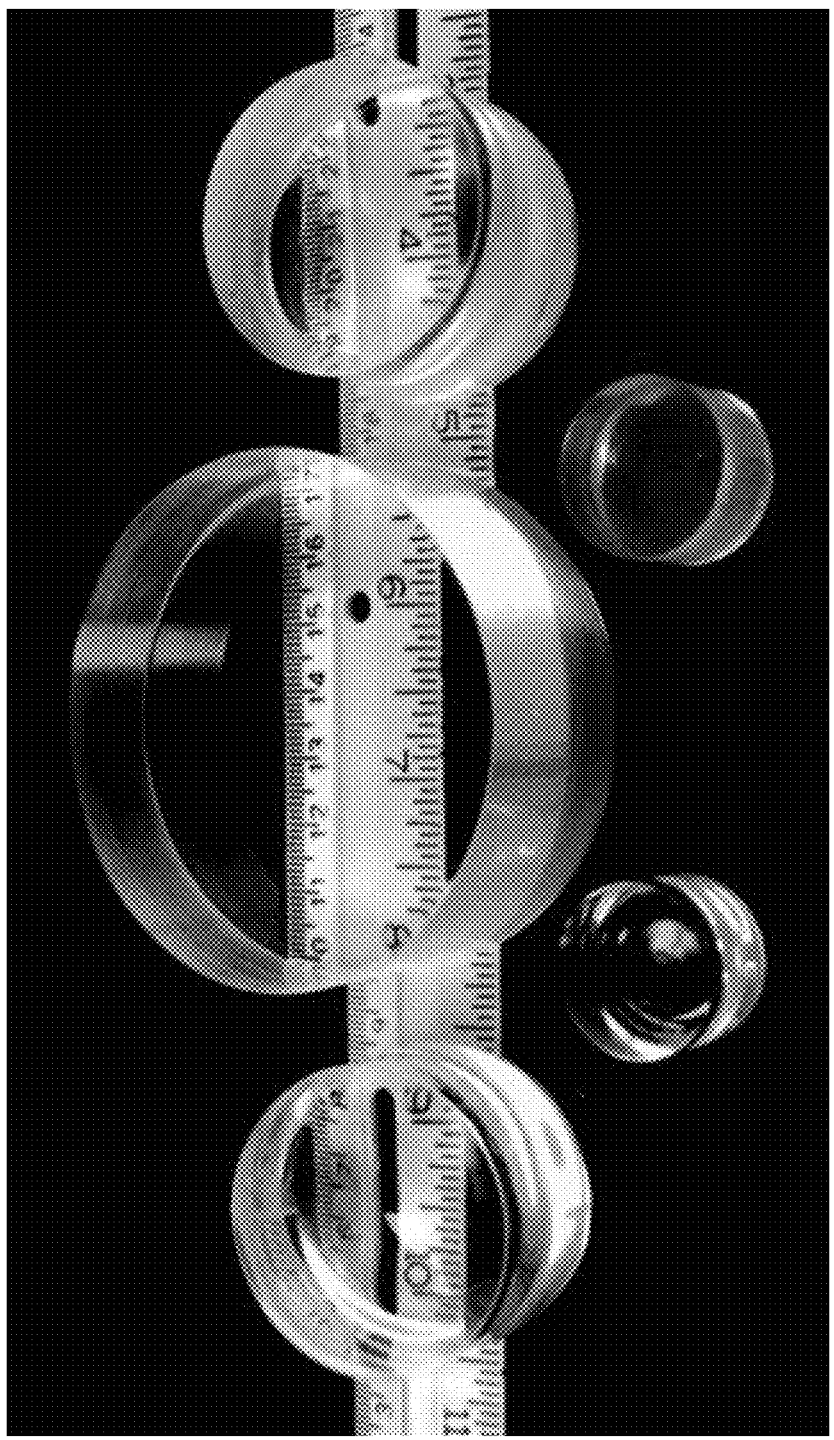
FIG. 6 illustrates optical transparent, homogeneous $^6$Li-loaded PSD plastics containing PPO (30%) and Li-3-PSA (5-7.5%) dissolved in polystyrene, and 0.2 wt % of secondary dyes (e.g. DPA, Bis-MSB, or POPOP).

Li-3-PSA is a colorless, stable in air compound that melts at about 137-138° C. Similarly to many commercially produced or lab-synthesized Li-organic compounds, it does not dissolve in any aromatic solvents, including toluene, xylene, or monomers, such as vinyltoluene or styrene used for liquid or plastic preparation. However, in the scintillator systems discloses herein, Li-3-PSA has been found to freely dissolve in many coordinating solvents, acetone, methanol, or DME miscible with pure aromatics. It is imporant to note, that simple solubility in coordinating solvents may not be a sufficient condition for the dissolution of Li-salts in aromatic matrices in various cases. Rather, without wishing to be bound by any theory, it is thought that Li-3-PSA reacts with some coordinating solvents to produce stable complexes with a diminished polarity, the diminished polarity helping its incorporation into organic matrices. This is supported by results obtained with the combination of Li-3-PSA and DME dissolved in polymer matrices containing high loading of PPO, which allows for current production of stable, optically transparent plastics with the Li-3-PSA concentrations of 5-10 wt. % (as shown in FIG. 6). In the case of a fully enriched $^6$Li single-isotope compound, this range of concentrations corresponds to 0.135-0.27 wt. % of $^6$Li loads. While higher content of $^6$Li may be utilized in some approaches, estimations show that Li-3-PSA concentrations of 5-10 wt. % are sufficient to provide thermal neutron capture efficiency up to 50-60% at a scintillator thickness of about 3 cm, thereby realizing new plastics useful for practical applications.

Figure 12B:
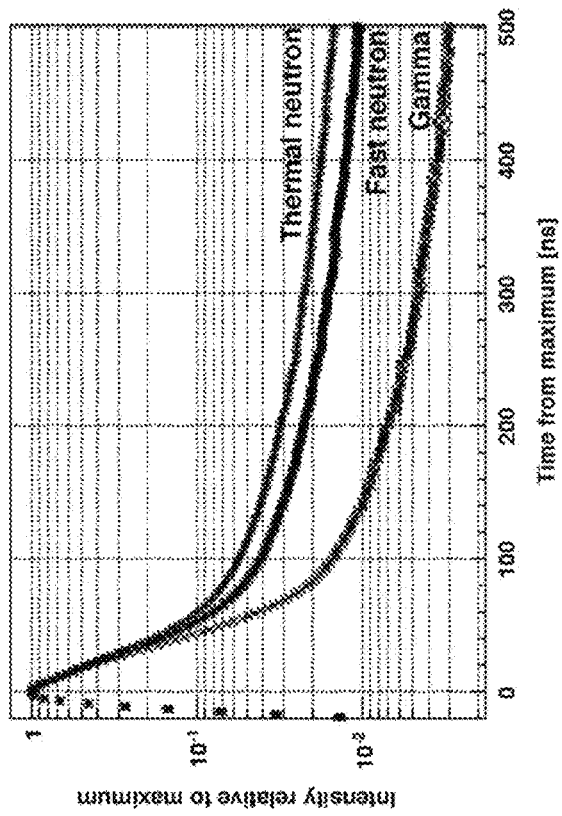
FIG. 12B shows average $^{252}$Cf waveforms corresponding to the normalized scintillation pulses recorded in the electron-equivalent range of 351-492 KeVee with unloaded polystyrene-based PSD plastic containing 30% of PPO, 0.2% DPA and 5% $^6$Li-3-PSA.
Figure 12A:
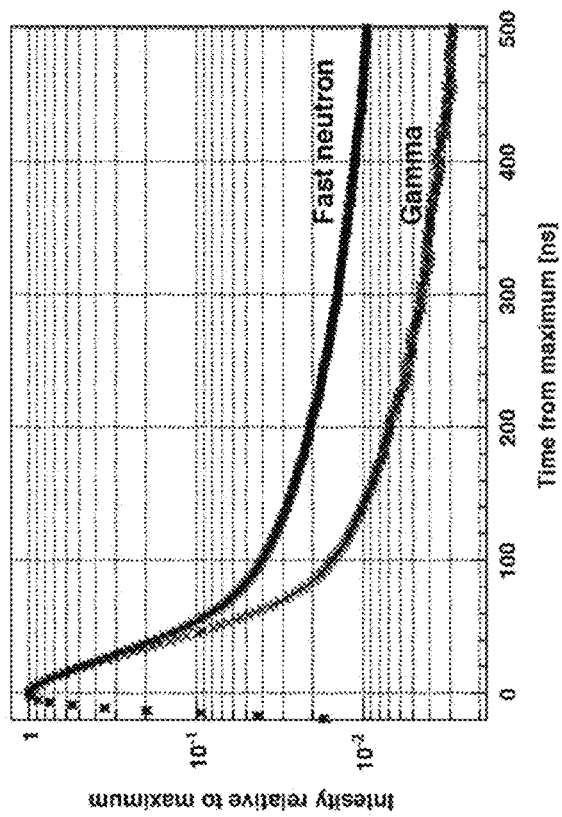
FIG. 12A shows average $^{252}$Cf waveforms corresponding to the normalized scintillation pulses recorded in the electron-equivalent range of 351-492 KeVee with unloaded polystyrene-based PSD plastic containing 30% of PPO and 0.2% DPA.

With respect to physical properties, such as hardness or transparency, the new Li-containing plastic scintillators disclosed herein are similar to regular plastic scintillators. The new Li-containing plastic scintillators do not evidence any obvious signs of physical instability or scintillation performance degradation. Measurements of PL spectra and decay characteristics showed that new Li-containing plastic scintillators have luminescence and prompt lifetimes typical for organic scintillators, in which the final emission generally occurs from the molecules of the secondary dyes (wavelength shifters). For the Li-containing plastic with DPA and Bis-MSB fluors, the lifetimes were measured as 6 ns and 3.4 ns, respectively. Examples of waveform averages obtained with the PSD plastics containing DPA as a secondary dye are shown in FIGS. 12A-12B. As follows from the comparison, all measured pulse averages have a shape consistent with having the same prompt component determined by the final emission from the DPA molecules. The relative intensities of the delayed emission, on the other hand, are different in pulses induced by different types of radiation. A regular hydrocarbon-based plastic (FIG. 12A) shows a scintillation response typical for organic scintillators with PSD, in which pulses corresponding to fast neutrons have noticeably higher relative intensity of the delayed component. The addition of 6Li to the composition of this plastic adds one more signature with a respective waveform containing the largest fraction of the delayed emission produced by the heavier alpha and triton particles originating in the capture reaction (FIG. 12B).

Figure 7A:
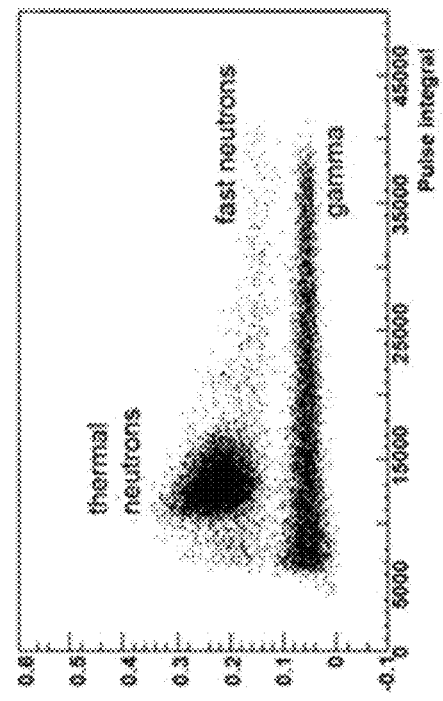
FIG. 7A shows PSD patterns for a PSD plastic scintillator comprising 5 wt % of $^6$Li-3-PSA measured using a $^{252}$Cf source without moderation.
Figure 7B:
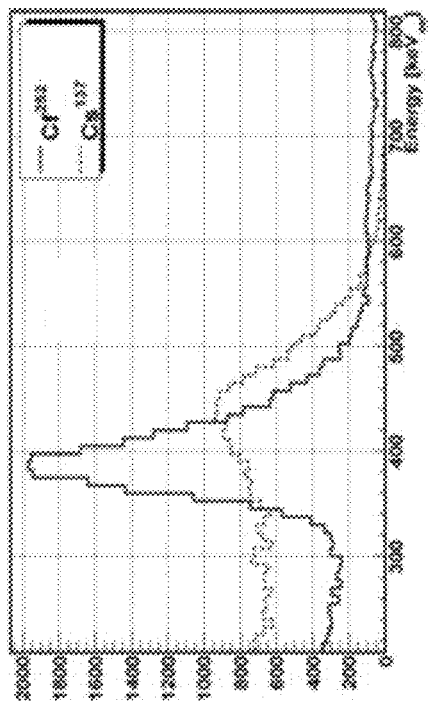
FIG. 7B shows PSD patterns for a PSD plastic scintillator comprising 7.5 wt % of $^6$Li-3-PSA measured using a $^{252}$Cf source with 10 cm of HDPE moderation.
Figure 7C:
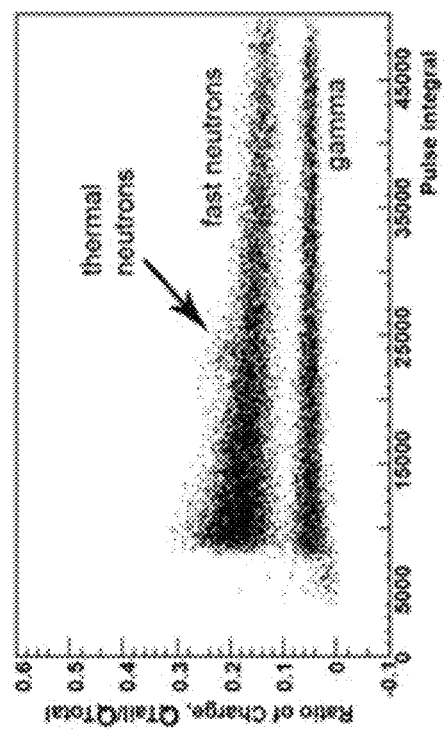
FIG. 7C shows PSD patterns for a PSD plastic scintillator comprising 5 wt % of $^6$Li-3-PSA measured using a $^{252}$Cf source with 5 cm of HDPE moderation.
Figure 7D:
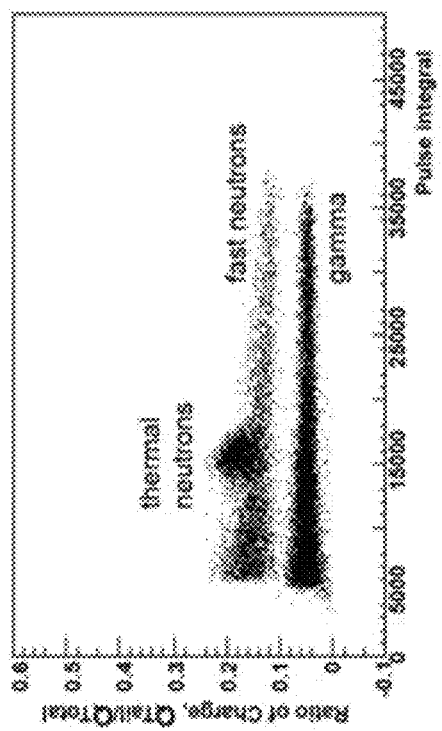
FIG. 7D shows $^{252}$Cf and $^{137}$Cs spectra corresponding to the PSD pattern in 7B, illustrating a sharply pronounced thermal neutron peak.

FIGS. 7A-7B shows experimental PSD patterns obtained, with selected samples of Li-loaded plastics measured with varying degree of HDPE moderation. The first pattern shown in FIG. 7A obtained with a plastic loaded with natural abundance of $^{Nat}$Li (~7.5% of $^6$Li) and a low degree of moderation provided by a 9 mm-thick cylinder containing the $^{252}$Cf source is similar to that typical for unloaded PSD plastics irradiated by a $^{252}$Cf source that emits only fast neutrons and gammas, with the exception of the small count increase corresponding to thermalized neutrons always present in the environment (shown by the arrow). The intensity of the thermal neutron peak increases with the increase of $^6$Li load and the use of moderation that leads to the fast-to-thermal neutron conversion (as shown in FIGS. 7B and 7D). For the cases corresponding to an intermediate amount of $^{252}$Cf moderation or to realistic conditions when both thermal and fast neutrons are present, the "triple" signature of two types of neutrons and gamma-rays can be obtained (as shown in FIG. 7C). It should be noted that at increasing size additional moderation effects may be introduced by the hydrogen-rich environment of the detector itself. Due to the monoenergetic nature of the alpha and triton particles produced by the capture reaction, the thermal neutron pulses may be concentrated in a narrow energy range leading to the appearance of a sharp peak with energy resolution (calculated as FWHM/mean) of 13% to 20%, depending on the composition and size of measured plastics.

The ability to simultaneously detect both thermal and fast neutrons discriminated from gamma rays is an important feature of the new Li-containing plastic scintillators. This unique property brings a substantial advantage of lithiated plastics over their regular unloaded counterparts, which can be used only for detection of fast neutrons above the low-energy threshold for neutron/gamma separation. For most known organic scintillators with PSD, the separation threshold falls into the energy range of about 50-100 keVee, which, depending on the type of materials with different quenching factors, may correspond to the neutron energy of 300-700 KeV. This means that a large fraction of less energetic neutrons cannot be detected using regular PSD materials. The fact that particles resulting from capture reaction produce scintillation pulses far above the discrimination threshold allows for the detection of thermal neutrons in the energy range where their signature can be clearly separated from the gamma radiation background.

Figure 8B:
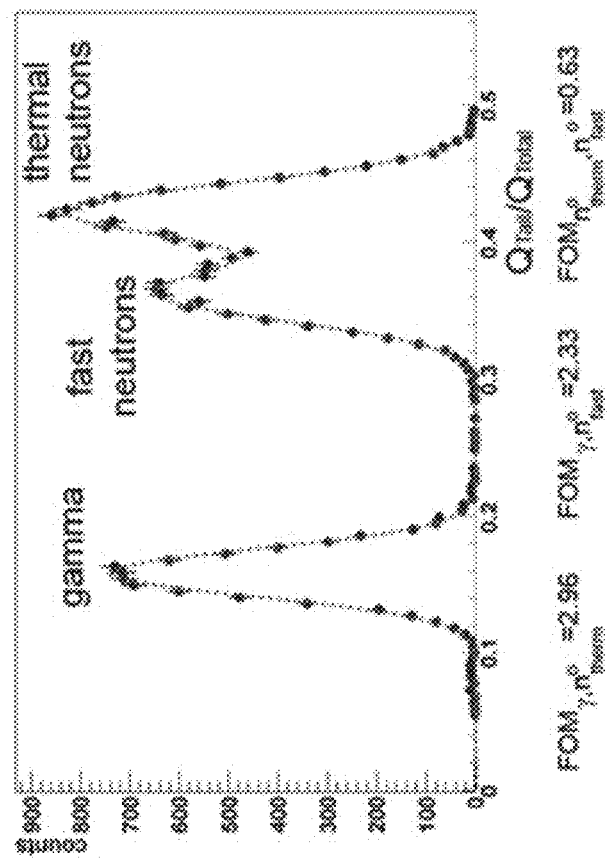
FIG. 8B shows PSD profiles obtained with 2.5 cm×2.5 cm thick PSD plastics containing 30 wt % of PPO, 5 wt % of Li-3-PSA in a PS matrix, and 0.2 wt % Bis-MSB measured using a $^{252}$Cf source with 2.5 cm of HDPE moderation. FOMs are calculated in near-thermal-neutron-spot energy range of by Gaussian approximation of individual peaks for gamma, fast neutrons and thermal neutrons.
Figure 8A:
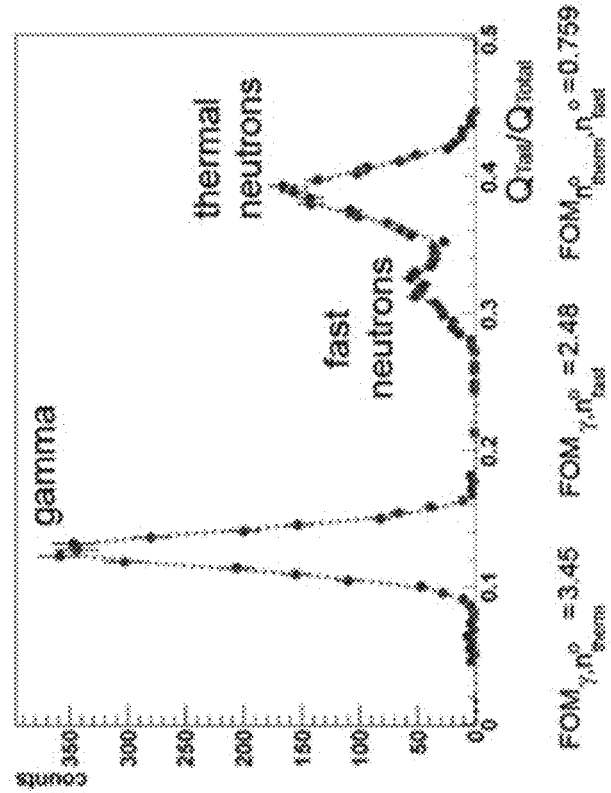
FIG. 8A shows PSD profiles obtained with 2.5 cm×2.5 cm thick PSD plastics containing 30 wt % of PPO, 5 wt % of Li-3-PSA in a PS matrix, and 0.2 wt % DPA measured using a $^{252}$Cf source with 10 cm of HDPE moderation. FOMs are calculated in near-thermal-neutron-spot energy range of by Gaussian approximation of individual peaks for gamma, fast neutrons and thermal neutrons.

FIGS. 8A and 8B show $^{252}$Cf PSD profiles obtained with 2.5 cm×2.5 cm thick plastics containing 30% of PPO and 5% of Li-3-PSA in PS matrix with 0.2% additions of secondary dyes. Specifically, the PSD plastic shown in FIG. 8A comprises the secondary dye DPA, and was measured with 10 cm of HDPE moderation. The PSD plastic shown in FIG. 8B comprises the secondary dye B—Bis-MSB, and was measured with 2.5 cm of HDPE moderation. FOMs are calculated in near-thermal-neutron-spot energy range of by Gaussian approximation of individual peaks for gamma, fast neutrons and thermal neutrons. The PSD FOMs with mean values of 3.45 and 2.96 calculated for the first examples of $^6$Li-loaded plastics in the near-thermal-neutron energy range (FIGS. 8A and 8B, respectively) correspond to efficient thermal neutron/gamma discrimination. At the same time, as shown in FIGS. 8A and 8B, the sensitivity to thermal neutrons does not diminish the ability of the new materials to detect fast neutrons (FOMs equal to 2.48 and 2.33, respectively).

Simultaneous detection of thermal and fast neutrons increases the total efficiency of neutron detection which, combined with a good degree of discrimination from gamma-rays, makes these novel $^6$Li-loaded plastics attractive for application in currently deployed detectors. There is, however, one more property of the new materials never utilized before in organic scintillators. As shown by the results of FIGS. 8A and 8B, in addition to the traditional neutron/gamma separation, there is one more type of discrimination between the signatures of thermal neutrons (alpha and triton particles) and fast neutrons (recoiled protons). The PSD FOMs corresponding to this type of discrimination are 0.759 and 0.63 as shown in FIGS. 8A and 8B, respectively.

Experimental Results

Liquid Scintillators

The experimental results for the liquid scintillators disclosed herein show that the Li compounds used for the preparation of plastic scintillators may also be introduced into compositions of liquids, e.g. aromatic liquids. For example, similar concentrations of Li-3-PSA may be used to obtain efficient PSD in xylene-based mixtures containing different primary and secondary dyes. Preliminary measurements made with traditional liquid scintillators (EJ-309) indicate that the method may be promising for commercial production of $^6$Li-loaded liquid scintillators with PSD.

Figures 9A, 9B:
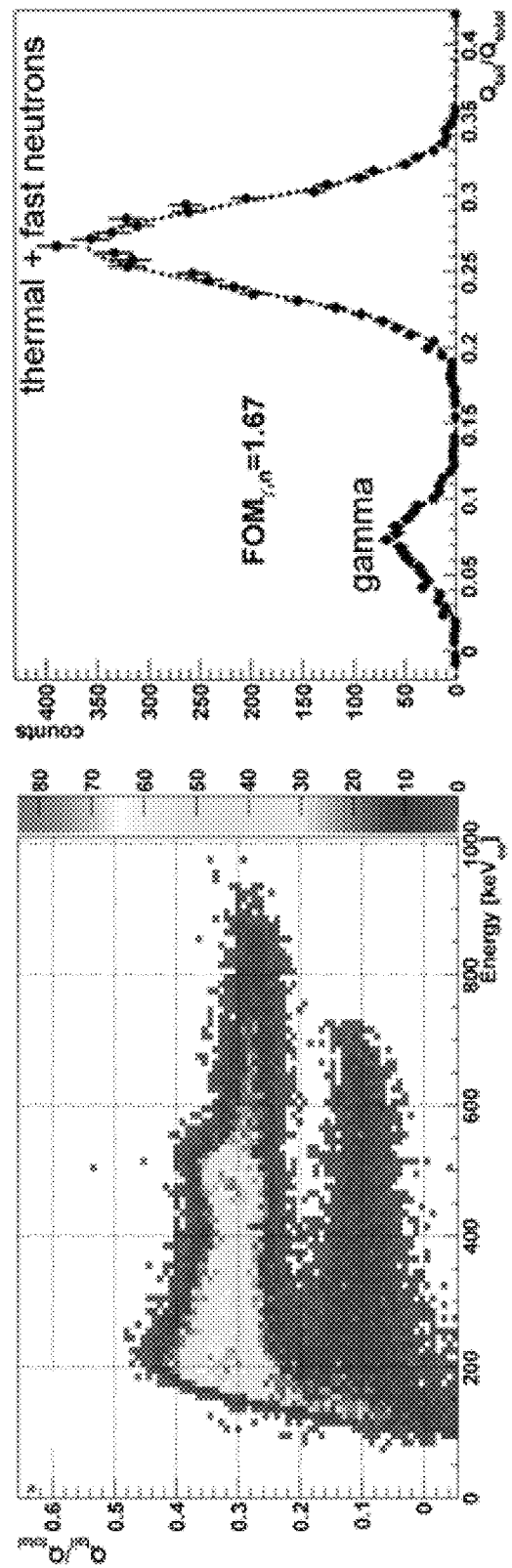
FIG. 9A shows energy-calibrated PSD patterns for a liquid scintillator prepared as a mixture of 30% PPO in xylene loaded with 5% Li-3-PSA measured using a $^{252}$Cf source with 5 cm of HDPE moderation.
FIG. 9B shows the PSD profile corresponding to FIG. 9A in the near-thermal-neutron-spot energy range showing no thermal/fast neutron separation.

Liquid scintillators were studied because of the advantage of easy and inexpensive preparation of efficient PSD mixtures by dissolution of only one scintillation dye in an aromatic solvent. FIG. 9A shows an energy-calibrated PSD pattern obtained with a liquid scintillator prepared with 30 wt. % of PPO dissolved in p-xylene, without any secondary dyes. Similar to plastic scintillators, addition of 5% Li-3-PSA to PPO-xylene solution leads to the appearance of a spot, corresponding to the thermal neutron signature. However, a surprising result is that this spot is practically embedded into the points corresponding to the fast neutron pulses, leading to a PSD profile with only one neutron band which includes both fast and thermal neutron counts separated from gammas (FOM=1.67 shown in FIG. 9B). The result may indicate that there is no detectable difference in the fraction of the delayed light produced by neutron capture products and protons in the scintillation material, making it similar to that reported in the past for a $^6$Li-loaded organic scintillators, where no discrimination between fast and thermal neutrons was observed.

Without wishing to be bound by any theory, it is thought that due to the much lower concentration threshold in liquids, efficient PSD may be obtained with a larger variety of low-soluble scintillation dyes (e.g., DPA, Bis-MSB, POPOP, etc.), which can be used for comparative analysis. FIGS. 10A and 10B shows the results obtained with one such dye, DPA, which when dissolved as a primary dye only at 1% concentration in xylene, produces PSD comparable to the best organic crystals and commercial liquids. As illustrated by FIGS. 10A and 10B, when 5% of Li-3-PSA is added to the DPA-xylene solution, the resulting mixture not only preserves the initial high degree of fast neutron/gamma discrimination, but also exhibits clearly pronounced separation between the signatures of two kinds of neutrons, with additional improvement of thermal neutron peak resolution calculated for the case of the DPA liquids as 9.5%.

Again not wishing to be bound by any theory, it is thought that one of the possible explanations of the differences in the performance of the liquids represented by FIGS. 9A/9B and 10A/10B may relate to the relation between the component band gaps, reflected by their PL spectra (as shown in FIGS. 11A-11D). Despite the fact that the first solution (FIG. 11A) contained a very high concentration of PPO (30%), its final spectrum is not of PPO but of typical Li-3-PSA emission. On the contrary, the second solution (FIG. 11C), which has only 1% of DPA mixed with 5% of Li-3-PSA, produces PL emission with the spectrum corresponding to pure DPA dissolved in xylene. The spectral differences may be understood based on the well-studied energy transfer phenomena in organic scintillation mixtures. The fact that the excitation spectrum of Li-3-PSA coincides with the emission spectrum of PPO (FIG. 11B) leads to the absorption of PPO emission by the molecules of Li-3-PSA that produces the major fraction of the final scintillation light. No such absorption is possible in the mixture of DPA and Li-3-PSA, in which, due to the lack of the spectral overlap (FIG. 11D), light from DPA cannot be absorbed by Li-3-PSA. The result is that in the first case the final emission is determined by Li-3-PSA molecules that presumably have significantly lower quantum yield in comparison to PPO, while in the second case, the final light output is produced mainly by very efficient DPA molecules. The major fraction of the light yield measured in both PL and scintillation experiments results from the de-excitation of the excited singlet states. However, similar processes of energy transfer may take place with the triplet states, migration and annihilation of which will be influenced by the combination of the bandgaps, leading to the differences in the light yield and PSD efficiency.

Applications and Uses

Embodiments of the present invention may be used in a wide variety of applications, and potentially any application in which high light yield and/or pulse shape discrimination between gammas, fast and thermal neutrons, charged particles, etc. is useful.

Illustrative uses of various embodiments of the present invention include, but are not limited to, applications requiring radiation detection. Detection, surveillance and monitoring of radioactive materials, including identification of special nuclear materials (SNM), are a few such examples. Various embodiments can also be used in the nuclear fuel cycle, homeland security applications, nuclear non-proliferation, medical imaging, special nuclear material, high energy physics facilities, etc. Moreover, the figure of merit (FOM) performance metric is already sufficient to distinguish neutrons from gammas down to the few hundred keV/gamma equivalent regime, and will be very useful for non-proliferation, homeland security and safeguards applications.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear device. Assessment of radiological dispersal devices is another application.

Further applications include radiography, dosimetry, and scientific research.

Any of the methods, systems, devices, etc. described above, taken individually or in combination, in whole or in part, may be included in or used to make one or more systems, structures, etc. In addition, any of the features presented herein may be combined in any combination to create various embodiments, any of which fall within the scope of the present invention. Following are several examples of general and specific embodiments.

For example, according to one embodiment a thermal neutron capture reagent, comprises a lithium-containing compound selected from a group consisting of: Li-3-phenylsalicylate, Li-3,5-di-tert-butylsalicylate, and Li-acetylsalicylic acid, wherein the compound is soluble in a fluor. In some approaches, the thermal neutron capture reagent may exhibit an optical response signature for thermal neutrons.

According to another embodiment, a plastic scintillator comprises a polymer matrix, a primary fluor, and a Li-containing compound, where the Li-containing compound is soluble in the primary fluor. The plastic scintillator may exhibit an optical response signature for thermal neutrons that is different than an optical response signature for fast neutrons and gamma rays in one approach. The scintillator may be substantially free of grain boundaries (e.g. comprise a homogenous composition) and be optically transparent in another approach.

In some approaches, the polymer matrix present in the plastic scintillator may include one or more aromatic groups. In other approaches, the polymer matrix present in the plastic scintillator may be selected from a group consisting of: polystyrene, polyvinyltoluene, and poly(methylmethacrylate). In yet other approaches, an initiator and a cross-linker may be present in the polymer matrix.

In more approaches, the primary fluor deposed in the plastic scintillator may be present in an amount of 0.5 wt % or more. In one approach, the primary fluor may be 2,5-diphenyloxazole (PPO). In another approach, the primary fluor may be crosslinked to the polymer matrix.

In even more approaches, the Li-containing compound present in the plastic scintillator may be a Li-salt of a carboxylic acid. In a preferred approach, the Li-containing compound may be selected from a group consisting of: Li-3-phenylsalicylate, Li-3,5-di-tert-butylsalicylate, and Li-acetylsalicylic acid.

In additional approaches, the plastic scintillator may further include a coordinating solvent. In various approaches, the Li-containing compound may be soluble in the coordinating solvent. In exemplary approaches, the coordinating solvent may be selected from the group consisting of: acetone, methanol, and dimethoxyethane.

In further approaches, the plastic scintillator may further comprise a secondary fluor, where the secondary fluor has a longer wavelength than the primary fluor. For instance, in one approach, the secondary dye may be present in an amount of less than 2 wt %. In another approach, the secondary fluor may be selected from the group consisting of: 9,10-diphenylanthracene and p-bis-(o-methylstyryl)-benzene.

In yet further approaches, a system may include the plastic scintillator described above, and a photodetector for detecting the response of the scintillator material to at least one or neutron and gamma ray irradiation.

According to another embodiment, a liquid scintillator includes a liquid scintillator material, a primary fluor that may be present in an amount of 0.01 wt % or more, and a Li-containing compound that is soluble in the primary fluor. In some approaches, the liquid scintillator may exhibit an optical response signature for thermal neutrons that is different than an optical response signature for fast neutrons and gamma rays. The liquid scintillator may be comprise a homogenous composition and be optically transparent in another approach.

In some approaches, the liquid scintillator material may be any commercially available liquid scintillator material with and/or without PSD properties. In other approaches, the liquid scintillator material may include one or more aromatic groups. In yet other approaches, the liquid scintillator material may include a xylene-based liquid.

In more approaches, the primary fluor deposed in the liquid scintillator may be present in an amount of 0.01 wt % or more. In one approach, the primary fluor may be 2,5-diphenyloxazole (PPO). In another approach, the primary fluor may be crosslinked to the polymer matrix.

In even more approaches, the Li-containing compound present in the liquid scintillator may be a Li-salt of a carboxylic acid. In a preferred approach, the Li-containing compound may be selected from a group consisting of: Li-3-phenylsalicylate, Li-3,5-di-tert-butylsalicylate, and Li-acetylsalicylic acid.

In additional approaches, the liquid scintillator may further include a coordinating solvent. In various approaches, the Li-containing compound may be soluble in the coordinating solvent. In exemplary approaches, the coordinating solvent may be selected from the group consisting of: acetone, methanol, and dimethoxyethane.

In further approaches, the liquid scintillator may further comprise a secondary fluor, where the secondary fluor has a longer wavelength than the primary fluor. For instance, in one approach, the secondary dye may present in an amount of less than 2 wt %. In another approach, the secondary fluor may be selected from the group consisting of: 9,10-diphenylanthracene and p-bis-(o-methylstyryl)-benzene.

In yet further approaches, a system may include the liquid scintillator described above, and a photodetector for detecting the response of the scintillator material to at least one or neutron and gamma ray irradiation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A thermal neutron capture reagent, comprising:
a lithium-containing compound selected from a group consisting of: Li-3-phenylsalicylate, Li-3,5-di-tert-butylsalicylate, Li-acetylsalicylic acid, and combinations thereof,
wherein the lithium-containing compound is soluble in a fluor,
wherein the thermal neutron capture reagent exhibits an optical response signature for thermal neutrons.

2. A scintillator, comprising:
a scintillator material;
a primary fluor; and
a Li-containing compound,
wherein the Li-containing compound is soluble in the primary fluor,
wherein the scintillator exhibits an optical response signature for thermal neutrons that is different than an optical response signature for fast neutrons and gamma rays,
wherein the Li-containing compound is selected from a group consisting of: Li-3-phenylsalicylate, Li-3,5-di-tert-butylsalicylate, Li-acetylsalicylic acid, and combinations thereof.

3. The scintillator as recited in claim 2, wherein the scintillator material is optically transparent.

4. The scintillator as recited in claim 2, wherein the primary fluor is 2,5-diphenyloxazole (PPO).

5. The scintillator as recited in claim 2, further comprising a coordinating solvent, wherein the Li-containing compound is soluble in the coordinating solvent.

6. The scintillator as recited in claim 5, wherein the coordinating solvent is selected from a group consisting of: acetone, methanol, and dimethoxyethane.

7. The scintillator as recited in claim 2, further comprising a secondary fluor, wherein the secondary fluor has a longer wavelength than the primary fluor.

8. The scintillator as recited in claim 7, wherein the secondary fluor is present in an amount of less than 2 wt %.

9. The scintillator as recited in claim 7, wherein the secondary fluor is selected from a group consisting of: 9,10-diphenylanthracene and p-bis-(o-methylstyryl)-benzene.

10. The scintillator as recited in claim 2, wherein the scintillator material comprises a polymer matrix.

11. The scintillator as recited in claim 10, wherein the polymer matrix includes one or more aromatic groups.

12. The scintillator as recited in claim 10, wherein the polymer matrix is selected from a group consisting of: polystyrene, polyvinyltoluene, and poly(methylmethacrylate).

13. The scintillator as recited in claim 10, wherein the polymer matrix comprises an initiator and a cross-linker, wherein the initiator is present in an amount ranging from about 0.001 wt % to about 1 wt %, and wherein the cross-linker is present in an amount ranging from about 0.05 wt % to about 5 wt %.

14. The scintillator as recited in claim 2, wherein the scintillator material comprises a liquid scintillator material.

15. The scintillator as recited in claim 14, wherein the liquid scintillator material includes one or more aromatic groups.

16. The scintillator as recited in claim 14, wherein the liquid scintillator material includes a xylene-based liquid.

17. A system comprising:
the scintillator of claim 2; and
a photodetector for detecting the response of the scintillator to at least one or neutron and gamma ray irradiation.

18. A method for fabricating a scintillator, the method comprising:
forming a precursor mixture; and
heating the precursor mixture until a polymerization process is complete,
wherein the precursor mixture comprises:
a monomer;
one or more fluors;
a coordinating solvent; and
a Li-containing compound selected from a group consisting of: Li-3-phenylsalicylate, Li-3,5-di-tert-butylsalicylate, Li-acetylsalicylic acid, and combinations thereof,
wherein the Li-containing compound is soluble in at least one of the one or more fluors.

* * * * *